US008120212B2

(12) United States Patent
Hamm et al.

(10) Patent No.: US 8,120,212 B2
(45) Date of Patent: Feb. 21, 2012

(54) METHOD FOR THE CONTROL OF AN ELECTRIC FENCE ENERGIZER

(75) Inventors: Valéry Hamm, La Fleche (FR); Yves Mulet-Marquis, La Meignanne (FR)

(73) Assignee: Lacme Holding, La Garenne Colombes (FR)

( * ) Notice: Subject to any disclaimer, the term of this patent is extended or adjusted under 35 U.S.C. 154(b) by 0 days.

(21) Appl. No.: 12/532,484

(22) PCT Filed: Mar. 19, 2008

(86) PCT No.: PCT/IB2008/001413

§ 371 (c)(1), (2), (4) Date: Feb. 23, 2010

(87) PCT Pub. No.: WO2008/117177

PCT Pub. Date: Oct. 2, 2008

(65) Prior Publication Data

US 2010/0148592 A1 Jun. 17, 2010

(30) Foreign Application Priority Data

Mar. 23, 2007 (FR) ..................................... 07 02151

(51) Int. Cl.
*H02H 11/00* (2006.01)

(52) U.S. Cl. ............ 307/326; 361/42; 361/115; 256/10; 119/416

(58) Field of Classification Search ........................ None
See application file for complete search history.

(56) References Cited

U.S. PATENT DOCUMENTS 3,655,994 A * 4/1972 Malme ...................... 307/132 R
4,175,255 A * 11/1979 Linnman et al. .............. 307/326
4,270,735 A * 6/1981 Gavin ............................ 256/10
5,321,318 A * 6/1994 Montreuil ..................... 307/326
5,767,592 A * 6/1998 Boys et al. ..................... 307/108
5,909,181 A * 6/1999 Golzmane ..................... 340/649
6,667,875 B1 * 12/2003 Hartmann ..................... 361/235
2002/0079909 A1 6/2002 Reeves
2003/0174451 A1 * 9/2003 Boudreaux et al. ............. 361/42
2003/0189432 A1 * 10/2003 Montreuil ..................... 324/649
2004/0156155 A1 * 8/2004 Ward .............................. 361/42
2008/0186172 A1 * 8/2008 Thompson .................... 340/541

FOREIGN PATENT DOCUMENTS

AU 198826906 A1 6/1989
DE 102 62 034 6/2004
FR 2 857 554 1/2005
GB 2 403 856 1/2006
NZ 240641 A 7/1995
WO 88/10059 12/1988
WO 00/35253 6/2000
WO 01/84892 11/2001
WO 2004/070149 9/2004

OTHER PUBLICATIONS

International Search Report dated Oct. 10, 2008, from corresponding PCT application.

* cited by examiner

*Primary Examiner* — Rexford Barnie
*Assistant Examiner* — Justen Fauth
(74) *Attorney, Agent, or Firm* — Young & Thompson

(57) ABSTRACT

Method for the control of an electric fence energizer of any given power, guaranteeing that, during each pulse emitted by the energizer, any human body that might have come into contact with the electric fence since a recent pulse does not run the risk of receiving a dangerous electric shock by reason of the pulse in progress.

33 Claims, 5 Drawing Sheets

METHOD FOR THE CONTROL OF AN ELECTRIC FENCE ENERGIZER

The subjects of the present invention are a method for controlling an electric fence energizer and an electric fence energizer for the implementation of this method.

Electric fences are designed to protect open areas, and notably fields, against the intrusion or the escape of an animal.

In order to increase the containment security in the case of very dense vegetation (in other words the presence of very significant parallel losses inducing a very low equivalent resistance across the terminals of the energizer), the document WO 88/10059 describes an electric fence energizer comprising two storage capacitors, the second capacitor being designed to be discharged when the energy delivered by the discharge of the first capacitor is no longer sufficient. By acting in an non-discriminating manner whenever the load across the terminals of the energizer exceeds a given value, this energizer would not be capable of preventing certain risks of accidents if the second storage capacitor were too large. For commercial reasons, it may in fact be tempting to oversize this second capacitor in such a manner as to make the consumer believe that, with an ever more powerful energizer, he will be able to indefinitely compensate for a lack of maintenance of his installation and/or to connect ever more extensive networks of electric fences powered by a single energizer. Thus, if the second capacitor is chosen to be enormous to the point where the output pulse of the energizer is unlimited when it is connected to a very low impedance then, although a significant part (or even the main proportion) of this pulse would generally be dissipated by an excessive vegetation, the remaining part will be large enough to be dangerous for some or all of the persons coming into contact with the fence.

The containment security must therefore be reconciled with people's safety. Indeed, in very rare cases, electric fences can be the cause of fatal accidents. Amongst these fatal accidents, "normal" accidents may be differentiated from "abnormal" accidents.

"Normal" accidents are accidents which may be explained:

by an installation error, or by an anomaly within the energizer, for example following a lightning strike, which can lead to the abnormal presence of a 230 V mains current on the electric fence, or by the fact that the victim, generally under the influence of alcohol or of drugs, gets tangled up in the fence to the point where he is never able to physically disentangle himself from the fence after coming into contact with it and dies from exhaustion after an extended time from the effort of contracting, upon each pulse, all or part of the muscles of his body.

In order to diminish the risk of "normal" fatal accidents, the document WO 00/35253 proposes an electric fence energizer comprising one or more capacitor(s) whose level of charge is controlled in such a manner that, when the variation ratio of the equivalent resistance observed across the terminals of the energizer takes a value greater than a pre-determined threshold during a pre-determined period of time, the level of charge of the capacitor or capacitors is modified in order to increase the chances, for example, of an animal entangled in the fence being able to escape.

The energizer described in this document has the drawback that the modification of the charge level does not allow the current pulse to be instantaneously modified and can only therefore be applied during the following cycles.

Moreover, such an energizer does not guarantee that, in the case of a person making contact with the fence, the pulse emitted by the energizer will not have been inadvertently oversized to the point of presenting a danger for that person.

"Abnormal" accidents are accidents due to a particularly low value (well below 500Ω and in some cases as low as 50Ω) of the impedance of the body of the victim, which is the case when the pulse flows through the head of the victim.

Until recently, the electric fence industry considered the value 500Ω as a lower bound of the possible impedance of the human body. However, a recent study by the IEC (International Electro-technical Commission—www.iec.ch) of a series of non-"normal" fatal accidents (Document CEI 61H/212/MTG—under document no 3) has concluded that, based on the evidence, these non-"normal" accidents happened with human body impedances much lower than 500Ω. The Standard IEC TS 60479-1 in its $4^{th}$ edition of July 2005 completes this new perspective by stating (in example 4 of Appendix D) that the impedance values of the human body as low as 50Ω are possible. Although it has not been possible for the lethal thresholds to be definitively determined, it is very probable that, for such low impedances, a first, sometimes too powerful, pulse suffices in certain cases to be fatal.

The lethal risk is not the only risk to be combated. Information that became apparent during the IEC study leads to the suspicion that, for these same very low human body impedances, pulses of energy below 5 Joules could sometimes suffice to render a human being unconscious. Although the latter might quickly regain consciousness, the spread of these types of incidents is not desirable. Indeed, it seems that the more powerful the pulses flowing through the head, the greater the risk of losing consciousness and the longer it will last.

This recent awareness of the lethal risk of pulses that are too powerful into very low impedances has resulted in two philosophically different approaches within the new standards subsequently revised, on the one hand, by the countries of the Southern Hemisphere (Australia and New Zealand) and, on the other, by the European countries.

In New Zealand and in Australia, the standard for installation of electric fences AS/NZS 3014:2003 has been updated by an amendment of the 10 Mar. 2006, which provides an adjunct to Appendix A 5.1 relating to the instructions for use of the energizers. It informs the user of certain potentially dangerous energizers that require the installation of one or more (depending on the number of conductors and/or branches in his fence) local power limiters (in the form of one or more resistors of 500 Ohms) upstream of every point of the fence where it is judged possible that a child roaming free and/or unaware of the dangers of the electric fence might get to. Those fences are specifically exempt that are connected to energizers for which a means equivalent to the limiter(s) of 500 Ohms is directly incorporated into the energizer, these energizers being intrinsically safe. In practice, this amounts to saying that only energizers whose energy maximum is obtained across a resistance below 500 Ohms should be concerned by the obligation to install limiters. The representatives at the IEC of the New Zealand standardization committee also made it known that they were going to organize a systematic campaign of information for farmers and for the general public in their country, in order to make people aware of this recent change in their local standard.

In Europe, the EN standard is in the process of being updated. Its new amendment has just reached the publication phase under the number EN 60335-2-76:2005/A11:200X. It provides that, instead of verifying that an energizer does not exceed 5 Joules on the single point 500 Ohms, it will now be verified that it does not exceed 5 Joules and 20 A peak over the range going from 50 to 500 Ohms. In this manner, the safety of the general public coming close to an electric fence will remain principally under the responsibility of the energizer manufacturers and not of the owner of the electric fence. The European approach consists in considering it as being more efficient to organize the safety with the few manufacturers rather than with the hundreds of thousands of users and the millions of members of the general public.

In order to reduce the risk of an “abnormal” fatal accident, the Patent FR 2 857 554 proposes an electric fence energizer controlled in such a manner that, when the equivalent resistance across the terminals of the energizer is in the ‘high-impedance’ region (>2000Ω) or in the low-impedance’ region (500 to 2000Ω) the discharge of the capacitor is systematically interrupted in order to maintain a low-energy pulse and, when the value of the equivalent resistance across the terminals of the energizer goes in ‘the ultra-low-impedance’ region (0 to 500Ω) for the first time, a time-out is initiated during which the energy of the pulse remains unchanged, then, at the end of the time-out, the energy of the discharge is increased. This control method allows a potential progressive growth of vegetation to be pre-empted while at the same time reducing the accident risk when the reduction in the resistance is due to the unexpected contact by a person, with pulses flowing through his head.

The energizer described in this document has the drawback that the energy of the pulse, which is of the order of 500 mJ, is not always sufficient to ensure a satisfactory containment security in a region of ‘high impedance’ or of ‘low impedance’ because the power may be consumed in these situations in significant proportions owing to the initial choice of a mediocre conductor or to the gradual appearance of ‘serial’ losses (for example degradation occurring at the junctions, on the conductors and/or at the grounding points). This degradation—which can occur over the course of time, for example as a result of bad weather—are referred to as ‘serial’ because they behave as resistors connected in series all the way along the electric fence. The ‘serial’ losses therefore represent an obligatory path for the part of the pulse emitted by the energizer that is effectively going to flow through the animal.

Another drawback of the energizer described in this document is that, by only monitoring the falling below a threshold without taking into account for example the information that it could extract from the knowledge that it necessarily has of the initial and final impedances, it does not offer any guarantees either that, in the case of a person coming into contact with the fence, the pulse emitted by the energizer—when the latter is operating beyond the settling period, in other words when the increase in energy of the discharge has been authorized—will not have been inadvertently oversized to the point of presenting a risk of death (or of unconsciousness) for this person.

In order to pre-empt another type of risk of fatal accident—completely hypothetical since never encountered up to now—the Patent FR 2 818 868 proposes an energizer controlled in such a manner that, when the equivalent resistance across the terminals of the energizer has fallen particularly low into the region of ‘ultra-low impedance’, the energizer stores and delivers a pulse of very high energy, then, when the equivalent resistance across the terminals of the energizer suddenly climbs to come back into the region of ‘low impedance’ or into the region of ‘high impedance’, following a sudden shortening of the fence, for example when an entrance gate is opened further down the fence by a user, the energizer prevents this pulse of too-high energy from being delivered. At each cycle, a pulse is prepared that depends on the equivalent resistance measured during the preceding cycle and, when the energizer detects during the current cycle an energy or voltage higher than a pre-determined limit depending on the equivalent resistance measured during the preceding cycle, the energizer blocks or diverts a part of the pulse of the current cycle.

The type of accident that this document seeks to prevent is an accident where the human body presents a conventional impedance, in other words higher than 500 Ohms, and as a result the energizer control method described in this document does not allow the risk of an “abnormal” accident or of unconsciousness to be reduced since it does not describe the detection of a reduction in the equivalent resistance across the terminals of the energizer. Moreover, the preparation of an output pulse as a function of the equivalent resistance measured during the preceding cycle may lead to a limitation in the available power of the output pulse, which may be detrimental in terms of containment security and/or of cost optimisation of the system.

In order to reduce the risk of a “normal” fatal accident, the document WO 2004/070149 proposes an electric fence energizer control system such that, when the rate of variation of the equivalent resistance observed across the terminals of the energizer goes outside of an acceptable range, the control system prevents the delivery of a pulse to the fence. In this case, the electric fence is in danger of no longer being able to contain the animals.

In conclusion, all these documents try to maintain a reasonable level of safety for people by only using an approach from the point of view of the output pulse that is emitted by the energizer. None of these documents allows the simultaneous maximization of people’s safety and of containment security.

The goal of the present invention is to provide a method for controlling an electric fence energizer that avoids, or at least reduces, some of the aforementioned drawbacks, which allows the risk of an “abnormal” fatal accident or of being rendered unconscious to be reduced while at the same time maximizing the containment security by allowing, under certain conditions, the energizer to emit into certain or into all the impedances particularly powerful pulses to the point of possibly being dangerous, while at the same time, when these conditions are not met, limiting the power of the pulse emitted by the energizer to a harmless level (or to the highest level possible that remains harmless), the conditions mentioned being characteristic of the occurrence or of the momentary maintenance of a non-negligible risk of the presence of a human body in contact with the fence. This method also has the goal of offering the consumer a real choice while being simple to implement and inexpensive. Another goal of the invention is to provide an electric fence energizer capable of implementing the method.

For this purpose, one subject of the invention is a method for controlling an electric fence energizer with periodic pulses, in which a proportion of a pulse capable of passing through a human body in contact with the said electric fence is higher than a danger threshold ($S_m$) not to be exceeded in the human body, the said danger threshold being relative to an electrical quantity of the pulse, the said energizer comprising or being associated with:

- means for determining a risk of the presence of a human body in contact with the said electric fence, or the absence of such a risk,
- means for calculating the proportion of a pulse capable of passing through a human body in contact with the fence,
- and means for limiting a pulse, characterized in that, during a pulse,

- when the said determination means have determined a risk of the presence of a human body in contact with the fence, and when the said calculation means have defined that the proportion of the said pulse capable of passing through the human body is higher than the said danger threshold ($S_m$), the said limiting means limit the said pulse such that the proportion of the said pulse received by the said human body is lower than the said danger threshold ($S_m$).

For example, in the case of a limitation, the pulse can be limited in such a manner that the proportion of the pulse received by the human body is substantially equal to the danger threshold. This non-zero limited pulse allows a relatively high containment security to be conserved without compromising people's safety, even in the presence of a risk of contact of a human body. The method may be executed at each pulse or during certain pulses.

According to other features of the invention:

the method comprises a step consisting in sending a command for a pulse to be delivered an electrical quantity of which is such that the proportion of this pulse capable of passing through a human body is higher than the said danger threshold ($S_m$), the said step being carried out during certain pulses where the absence of risk of a human body in contact with the electric fence has been determined;

the method comprises a step consisting in sending a command for a pulse to be delivered an electrical quantity of which is such that the proportion of this pulse capable of passing through a human body is higher than the said danger threshold ($S_m$), the said step being carried out during certain pulses where the absence of risk of a human body in contact with the electric fence has been determined and where the energizer is capable of delivering such a pulse;

the said means for determining a risk of the presence of a human body in contact with the said electric fence comprise a video analysis system with shape recognition, and/or a system for analysing the mechanical tension or vibrational state existing within conductors of the electric fence, and/or a system for analysing the audio signal existing in proximity to the electric fence, and/or a system for analysing the resistive part of the equivalent impedance observable at a point in the electric fence during in each pulse, and/or a visual, mechanical, audio or electrical surveillance system, internal or external to the energizer, at the start of the electric fence, or displaced to one, or possibly distributed over several, point (s) of the electric fence;

the determination of a risk of the presence of a human body in contact with the said electric fence is performed just before the pulse is launched or during the first part of the production of the said pulse, before the said pulse has reached a level presenting a risk for a human body that could potentially be in contact with the electric fence;

when the absence of risk of the presence of a human body has been determined, the pulse delivered is higher than or equal to the said danger threshold ($S_m$);

when a risk of the presence of a human body has been determined, the method comprises a step consisting in initiating a time-out during which each pulse is limited, the duration of the time-out being, where desirable, adjustable by a manufacturer and/or by a user;

the method comprises a step consisting in carrying out a measurement of the equivalent resistance across the terminals of the said energizer equivalent resistance;

a risk of the presence of a human body is determined when the current equivalent resistance measured during the current pulse is lower than a preceding equivalent resistance measured during a preceding pulse;

the absence of risk of the presence of a human body is determined when the current equivalent resistance is higher than or equal to a preceding equivalent resistance measured during a preceding pulse;

the absence of risk of the presence of a human body is determined when the current equivalent resistance is higher than or equal to a preceding equivalent resistance measured during a preceding pulse, the said current equivalent resistance being lower than a pre-determined percentage greater than 100% of the said preceding equivalent resistance;

a risk of the presence of a human body is determined when the current equivalent resistance is higher than or equal to the said pre-determined percentage greater than 100% of the said preceding equivalent resistance;

the method comprises a step consisting in determining the maximum proportion of the said pulse capable of passing through the said human body as a function of the said current equivalent resistance and of a preceding equivalent resistance measured during a preceding pulse;

the said danger threshold being relative to the pulse energy, when a risk of the presence of a human body has been determined, the maximum pulse emitted by the energizer is lower than or equal to the product of the said danger threshold and of the ratio between, on the one hand, a preceding equivalent resistance measured during a preceding pulse and, on the other, the difference between the said preceding equivalent resistance and the current equivalent resistance;

the said danger threshold being relative to the pulse energy, the absence of risk of the presence of a human body in contact with the fence where the human body could receive a proportion of the pulse higher than the said danger threshold ($S_m$) is determined when, during the preceding pulse, the absence of risk of the presence of a human body in contact with the fence has been determined, and the maximum pulse that could be emitted by the energizer for the current equivalent resistance is lower than or equal to the product of the said danger threshold and of the ratio between, on the one hand, the preceding equivalent resistance measured during the preceding pulse and, on the other, the difference between the said preceding equivalent resistance and the current equivalent resistance.

the said danger threshold being a function of the pulse voltage or of the pulse current, when a risk of the presence of a human body has been determined, the maximum output pulse emitted by the energizer is lower than or equal to the said danger threshold;

the limiting of the pulse is carried out at a moment determined as a function of the maximum pulse capable of being delivered by the said energizer for the said current equivalent resistance;

the said time-out is interrupted when the current equivalent resistance climbs back above a pre-determined threshold;

the said pre-determined threshold corresponds to the equivalent resistance measured during the pulse preceding the pulse during which the said time-out has been triggered;

the said pre-determined threshold corresponds to the sum of the trigger equivalent resistance measured during the trigger pulse during which the time-out has been triggered and of a pre-determined percentage of the difference between the previous equivalent resistance measured during the pulse preceding the trigger pulse and the trigger equivalent resistance;

the said time-out is interrupted when the current equivalent resistance climbs back above the previous equivalent resistance measured during the pulse preceding the trigger pulse during which the time-out has been triggered, the current equivalent resistance not exceeding a pre-determined percentage higher than 100% of the said preceding equivalent resistance;

the said time-out is interrupted when the current equivalent resistance climbs back above the sum of the trigger equivalent resistance measured during the trigger pulse during which the time-out has been triggered and of a first percentage pre-determined from the difference between the previous equivalent resistance measured during the pulse preceding the trigger pulse and the trigger equivalent resistance, the said current equivalent resistance not exceeding a second pre-determined percentage higher than 100% of the said preceding equivalent resistance;

the method is only executed when the said equivalent resistance measured across the terminals of the energizer is lower than a pre-determined threshold ($R_s$) or included within a pre-determined range [$R_{s1}$; $R_{s2}$]);

a risk of the presence of a human body in contact with the electric fence is determined as a function of a pre-determined minimum impedance ($H_b$) of a human body and/or of a pre-determined maximum impedance ($H_h$) of a human body, the said minimum and maximum impedances being, where required, adjustable by a manufacturer and/or a user;

the previous equivalent resistance ($R_d$) being associated with the last pulse for which the absence of risk of the presence of a human body has been determined, characterized in that the absence of risk of the presence of a human body is determined when the current equivalent resistance ($R_c$) is higher than or equal to the previous equivalent resistance ($R_d$) or when $[R_d \cdot R_c/(R_d - R_c)] < H_b$;

the said danger threshold ($S_m$) being relative to the pulse energy, characterized in that a risk of the presence of a human body is determined when the current equivalent resistance ($R_c$) is lower than the previous equivalent resistance ($R_d$), and, in this case, if the current equivalent resistance ($R_c$) is higher than $H_h \cdot R_d/(R_d + H_h)$, then the maximum pulse emitted by the energizer is lower than or equal to $S_m \cdot R_c \cdot R_d^2/[H_h \cdot (R_d - R_c)^2]$ otherwise, the maximum pulse emitted by the energizer is lower than or equal to $S_m \cdot R_d/(R_d - R_c)$.

when a risk of the presence of a human body is determined, the method limits the current pulse to a level depending on a pre-determined minimum impedance ($H_b$) of a human body and/or of a pre-determined maximum impedance ($H_h$) of a human body;

the said danger threshold ($S_m$) varies as a function of the configuration of the fence and/or of weather and/or time conditions and/or of geographical location and/or of altitude and/or of installation of the electric fence within its environment or again as a function of the duration of the maximum time-out programmed by the user or of the date;

the said danger threshold ($S_m$) varies as a function of the number of consecutive pulses for which a risk of the presence of a human body has been determined;

the said danger threshold ($S_m$) is an energy in joules, or a peak value of current in amps, or an r.m.s. current in amps, or a peak value of voltage in volts, or an r.m.s. voltage value in volts, or a maximum quantity of electricity per pulse in coulombs, or a maximum pulse duration, or a period during which the instantaneous value of the pulse exceeds a certain current level, or a specific fibrillation energy, or a specific charge, or an instantaneous power, or a combination of danger thresholds formed using several of these dimensions;

the said energizer and capable of delivering pulses of more than 200 Joules into 500 Ohms and the said danger threshold is lower than or equal to 5 Joules for a human body whose impedance is in the range between 50 and 1050 Ohms, the energizer being capable of delivering pulses of more than 200 Joules when the said electric fence has been stabilized for 60 minutes at an equivalent resistance of 500 Ohms+/−5%;

the said danger threshold is adjustable by a manufacturer and/or by a user.

Another subject of the invention is an electric fence energizer capable of executing the method.

According to one embodiment of the invention in which the danger threshold ($S_m$) includes a component characterizing a pulse duration, an electronic circuit measures the discharge pulse duration in real time and limits the latter when it reaches, for the first time, X % of the said component characterizing a pulse duration with X strictly less than 100.

According to another embodiment in which the quantity being considered for the danger threshold ($S_m$) is an r.m.s. value, an electronic circuit measures the r.m.s. voltage or the r.m.s. current of the discharge pulse in real time and limits the latter when it reaches, for the first time, X % of the danger threshold ($S_m$).

The invention will be better understood, and other aims, details, features and advantages of the latter will become more clearly apparent in the course of the detailed explanatory description that follows of several non-exhaustive embodiments of the invention presented by way of examples that are purely illustrative and non-limiting, with reference to the appended schematic drawings.

Figure 1A:
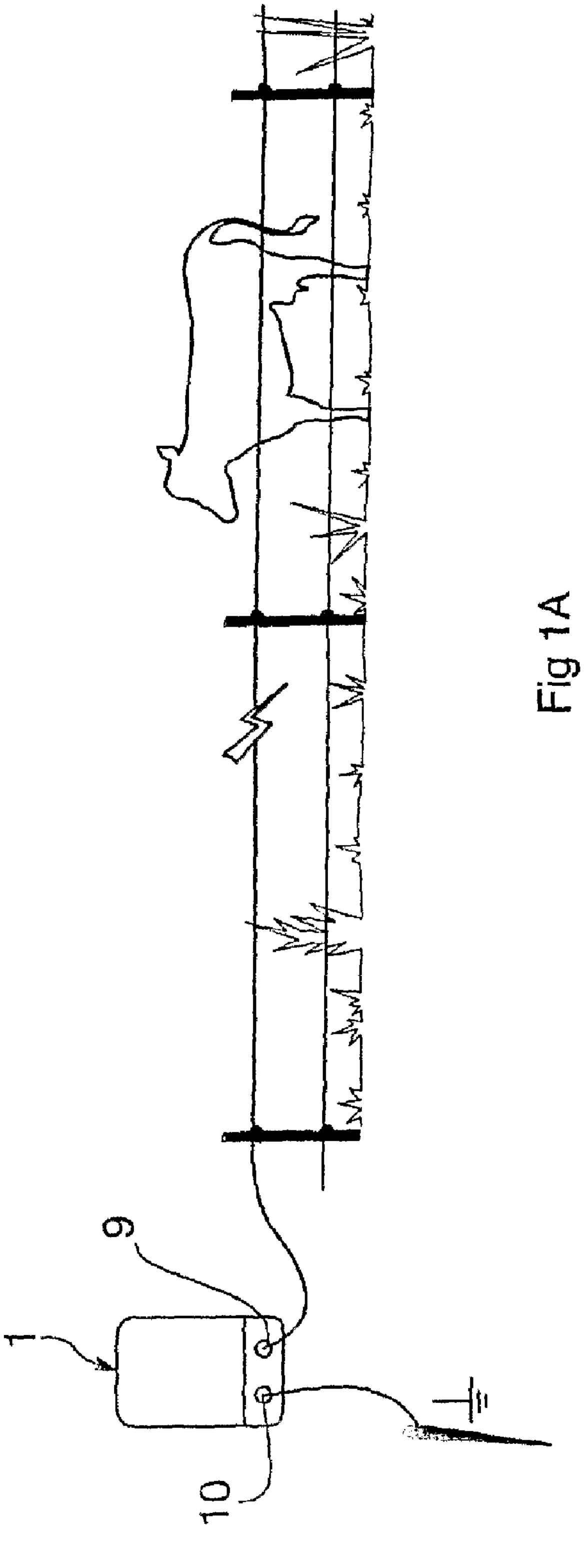
FIG. 1A is a simplified schematic view of an energizer, according to one embodiment of the invention, connected to an electric fence.

In the following part of the description, $S_m$ is called a danger threshold considered as a maximum acceptable for the proportion of the output pulse capable of passing through a human body while remaining harmless. The impedance of the human body can take any value between a low value $H_b$ and a high value $H_h$, for example, if reference is made to the standard CEI TS 60479-1, the range [50 to 1050 Ohms].

The threshold $S_m$ is relative to an electrical quantity of the pulse, which can for example be an energy in Joules, for example 500 mJ or even 3 J. As a variant, the threshold $S_m$ may be relative to a current in Amps, for example 5 A peak or 3.5 A r.m.s. or 10 A peak or 7 A r.m.s., or else a voltage expressed in Volts, for example 8000 V peak or 5650 V r.m.s. or 2000 V peak or 1750 V r.m.s. It can also be relative to a pair of quantities (or even an n-fold set) characterizing a double threshold (or an n-fold threshold), for example energy and current (e.g. 3 J and 7 A r.m.s.) or energy and voltage (e.g. 0.5 J and 2000 V peak). In particular, the threshold $S_m$ can be relative to an r.m.s. current coupled with an associated pulse duration $\Delta t_m$ not to be exceeded so that the pulse flowing through the human body remains harmless. The above list of the possible dimensions of $S_m$ is not of course exhaustive and could be extended for example by making reference to coulombs, to an instantaneous peak power, to a pulse duration, etc.

The threshold $S_m$ is not necessarily a fixed parameter. It can for example vary according to a change in the physical conditions (external temperature, humidity, time of day or of year, geographical location such as altitude or the location of the electric fence inside a building, etc.) existing around or within the electric fence.

The threshold $S_m$ may also vary over time according to the number of pulses having already passed through the human body, in other words the threshold $S_m$ can take a first value when a first pulse passes through a human body and a second value starting from a certain number of subsequent pulses passing through the same human body. The threshold $S_m$ can thus, in particular, be reduced during a time-out period initiated following the detection of a risk of the presence of a human body which tends to continue.

The threshold $S_m$ may for example be derived from scientific knowledge or be chosen arbitrarily by the manufacturer or the user.

In the following part of the description, it will always be a human body that is mentioned, but it will be clearly understood that the invention could be applied in a similar manner with a threshold $S_m$ chosen in order to ensure the physical safety of one category of animal, or of animals as a whole.

It will be noted that the threshold $S_m$ must not be confused with the maximum energy (or the maximum current or maximum voltage, respectively) conventionally permitted for an output pulse leaving the energizer, such as is defined in the recent or prior versions of the CEI or CENELEC 335-2-76 standard. Indeed, the threshold $S_m$ is defined from the point of view of a human body in contact with the electric fence and not from the point of view of the output pulse across the terminals of the energizer.

Figure 1B:
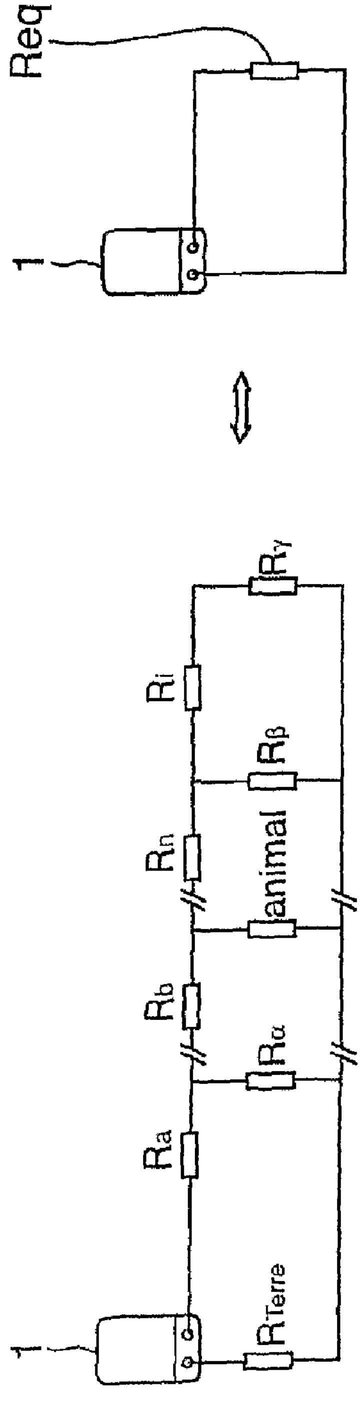
FIG. 1B is a simplified schematic view symbolizing the electric fence in FIG. 1A.

Referring to FIG. 1, an energizer 1 is connected to the complete system formed by an electric fence and its environment. A high-voltage electrical pulse of very short duration flows on the conducting fence about every second. This pulse leaves the first terminal 9 of the energizer 1 and propagates along the conducting wire, then, after being both progressively attenuated and divided up, it returns via all the return paths possible to the second terminal 10 of the energizer 1. On its way, it will potentially encounter resistances "in series" (conductor, junctions, earth points, etc.) and resistances "in parallel" (grass, faulty insulators, conductors partially fallen on the ground, etc.). This all forms a complete system which can be schematically represented (to a first approximation neglecting the imaginary components of the complex impedances) by a network of resistors $R_a$ to $R_i$ and $R_\alpha$ to $R_\gamma$, which can itself be summarized, at any given moment in time, by a single equivalent resistance $R_{eq}$ present across the terminals of the energizer 1.

Figure 2:
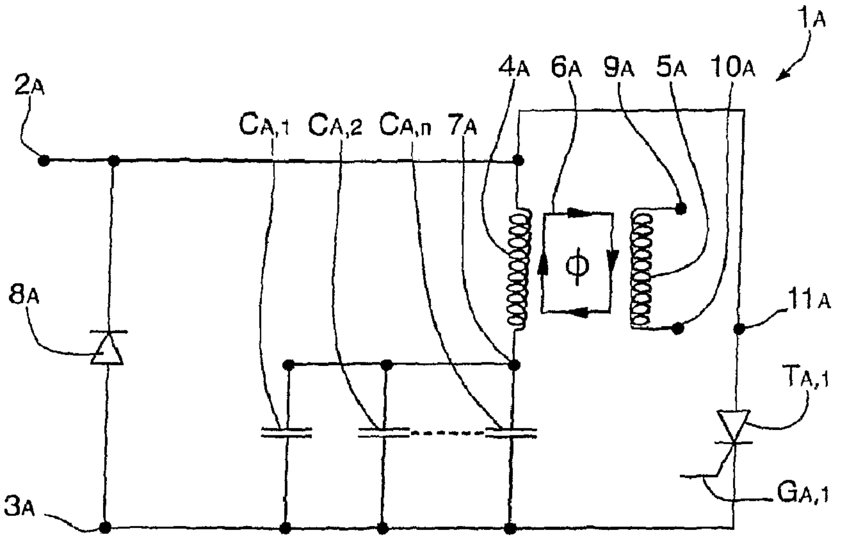
FIG. 2 is a simplified schematic view of the energizer in FIG. 1A.

Referring to FIG. 2, an electric fence energizer $\mathbf{1}_A$ can be seen comprising two input terminals $\mathbf{2}_A$ and $\mathbf{3}_A$ connected to a known power supply circuit, not shown.

The energizer $\mathbf{1}_A$ comprises a transformer whose primary $\mathbf{4}_A$ is connected between the input terminal $\mathbf{2}_A$ and a common point $\mathbf{7}_A$. An assembly of storage capacitors $C_{A,1}$ to $C_{A,n}$, n being an integer greater than or equal to 2, is connected in parallel between the common point $\mathbf{7}_A$ and the input terminal $\mathbf{3}_A$.

A thyristor $T_{A,1}$, with its trigger input $G_{A,1}$, is connected in parallel with the primary $\mathbf{4}_A$ and the energy storage capacitors $C_{A,1}$ to $C_{A,n}$.

A diode $\mathbf{8}_A$ is connected between the terminals $\mathbf{2}_A$ and $\mathbf{3}_A$ in order to, in a conventional manner for those skilled in the art, protect the thyristor $T_{A,1}$ when the current is reversed in the L-C circuit formed by the primary $\mathbf{4}_A$ and the capacitors $C_{A,1}$ to $C_{A,n}$.

The primary $\mathbf{4}_A$ of the transformer is coupled, via a magnetic circuit $\mathbf{6}_A$, to the secondary $\mathbf{5}_A$ of the transformer. The output terminals $\mathbf{9}_A$, $\mathbf{10}_A$ of the secondary $\mathbf{5}_A$ supply the conducting elements of the fence (not shown).

The capacitors $C_{A,1}$ to $C_{A,n}$ are charged up to the same voltage $V_c$ of several hundreds of volts by a known means (not shown). When a control pulse is applied to the trigger input $G_{A,1}$ of the thyristor $T_{A,1}$, the latter starts to conduct and the capacitors $C_{A,1}$ to $C_{A,n}$ are discharged through the primary $\mathbf{4}_A$ of the transformer. A pulse then appears across the terminals of the secondary $\mathbf{5}_A$.

The energizer $\mathbf{1}_A$ comprises an electronic control module (not shown) designed to trigger the thyristor $T_{A,1}$ by way of its trigger input $G_{A,1}$ in order to control the discharge of the capacitors $C_{A,1}$ to $C_{A,n}$.

The electronic module comprises means for determining a risk of the presence of a human body in contact with the said electric fence, or the absence of such a risk, means for calculating the proportion of a pulse likely of passing through a human body in contact with the fence, and means for limiting a pulse.

Figure 3A:
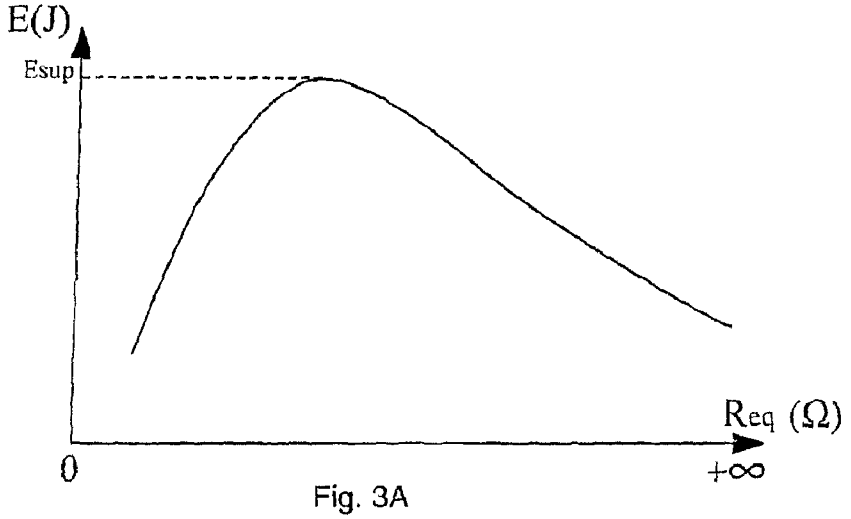
FIG. 3A is a graph showing a curve of the energy of the pulse emitted by the energizer in FIG. 1A as a function of the equivalent resistance between its output terminals.

Referring to FIG. 3*a*, which shows the output characteristic of the energizer $\mathbf{1}_A$ in FIG. 2, it can be seen that the energy E of the output pulse, in other words the energy delivered at each pulse by the energizer $\mathbf{1}_A$, varies as a function of the equivalent resistance $R_{eq}$ present between the output terminals $\mathbf{9}_A$ and $\mathbf{10}_A$.

Now, the equivalent resistance $R_{eq}$ is the resistance of the loop circuit, in other words the resistance corresponding to the various components of the combination of the fence, of the grass and other "parallel" losses, of the animal and of the return earth point and other "serial" losses.

The "parallel" losses are a consequence of the appearance of an electrical loss resistance between the high-voltage wire of the electric fence and ground, for example owing to a growth of vegetation, to tree branches falling onto the fence, to insulators becoming progressively faulty, to the increase in humidity, etc. These losses are referred to as "parallel"

because, in their presence, a certain fraction of the electrical pulse which has been emitted by the energizer passes through the electrical loss resistance to then return to the energizer via the earth point without ever having passed through the body of the animal or of the person.

In FIG. 3*a*, it can be observed that, for the highest values of the equivalent resistance $R_{eq}$, the energy E of the pulse output from the energizer is lower than the maximum possible value $E_{sup}$.

It can also observed that, when the resistance $R_{eq}$ decreases from these highest values (for example owing to parallel losses increasing over the course of time), the energy E increases until it reaches the maximum value $E_{sup}$.

It can furthermore be observed that, having passed its maximum value $E_{sup}$, when the resistance $R_{eq}$ continues to decrease to then reach the lowest values, the energy E decreases from the value $E_{sup}$.

Finally, it can be observed that the curve in FIG. 3*a* does not vary as a function of time, in other words, for a given value of the resistance $R_{eq}$, the energizer $\mathbf{1}_A$ delivers the same pulses at each cycle whether this be that of the first second, that after one minute or after one hour, for example.

Figure 3B:
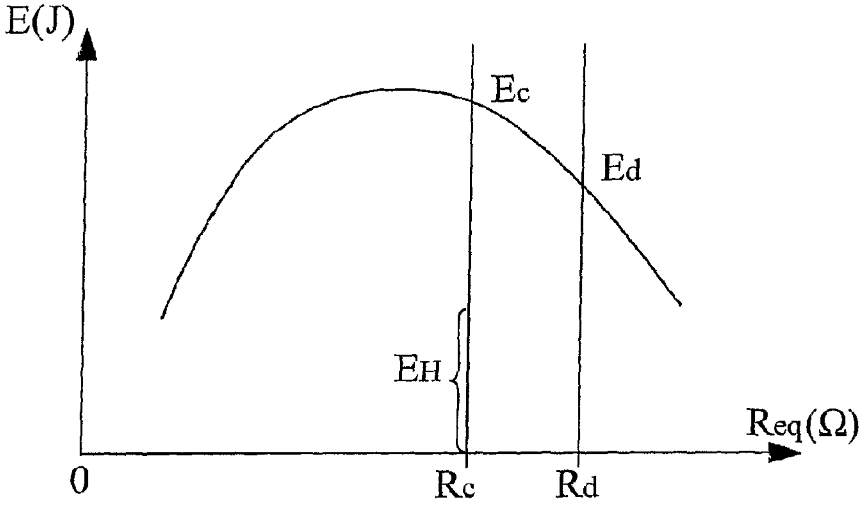
FIG. 3B is a graph similar to FIG. 3A displaying two successive values of equivalent resistances corresponding to two consecutive cycles between which a human body has come into contact with the fence.

In FIG. 3*b*, it can be observed that, at time $t_n$, the equivalent resistance $R_{eq}$ across the terminals of the energizer—in other words that of the complete system (formed by the electric fence and its environment)—has a value $R_d$, the energizer $\mathbf{1}_A$ in FIG. 2 delivering an energy $E_d$. It is assumed that the energizer has stabilized at this point of equilibrium, in other words that the resistance $R_{eq}$ has had the value $R_d$ for some time. At time $t_{n+1}$, moment of the next pulse, around one second later, it is assumed that the resistance $R_{eq}$ of the complete system has changed owing to the arrival of a human body in contact with the electric fence, the fence not having been simultaneously shortened. The resistance of the human body for the path of the pulse in question through this human body is a resistance H and is not a constant. The resistance H varies from one person to another and from one path (from the point of entry into the human body up to the point of exit from the human body) to another. Across the terminals of the energizer $\mathbf{1}_A$, the resistance of the complete system has therefore gone from the value $R_d$ to the value $R_c$, where $R_c < R_d$, and the energy of the pulse output from the energizer in FIG. 2 is an energy $E_c$.

The energy of the proportion of this pulse that will pass through the human body of resistance H is the energy $E_H$. Depending on the location on the fence where the human body comes into contact with the fence, there are of course various values of resistance of the human body which allow the resistance $R_{eq}$ to go from the value $R_d$ to the value $R_c$. Let the value $H_{c0}$ be the largest value of the resistance H that allows the resistance $R_{eq}$ to go from the value $R_d$ to a given value $R_c$. Mathematical analysis shows that the value $H_{c0}$ is for the case of a very particular human body coming into direct contact with the output terminals of the energizer $\mathbf{1}_A$. Indeed, the further away from the terminals of the energizer $\mathbf{1}_A$, the lower the value of the resistance H must be for the resistance $R_{eq}$ to go from the value $R_d$ to the value $R_c$. When $R_d$ and $R_c$ are known, then $H_{c0}$ can be calculated from the equation:

$$1/R_d + 1/H_{c0} = 1/R_c$$

Furthermore, in this particular case, the energy of the proportion of the pulse that passes through the human body, in other words the resistance $H_{c0}$, is perfectly defined by the equation:

$$E_{Hc0} = E_c \times [R_d/(R_d + H_{c0})]$$

Now, the mathematical analysis furthermore also allows it to be stated that, for given $R_d$ and $R_c$ values, of all the human bodies of resistance H that will allow the equivalent resistance $R_{eq}$ to go from the value $R_d$ to the value $R_c$, it is the particular case of the human body directly across the terminals (and therefore of resistance $H_{c0}$ defined hereinabove) through which the largest proportion of the energy of the pulse will pass. The energy $E_{Hc0}$ is therefore the lowest possible upper bound of the energy that can flow in a human body for all of the values of human body resistance that could, depending on their contact point along the fence, have allowed the resistance $R_{eq}$ of the complete system to go from the given value $R_d$ to the given value $R_c$. It is on this key observation that the preferred embodiment of the method, subject of the invention, is based.

If it is required for any one of the possible human bodies that could have come into contact at some point along the fence, the fence not having simultaneously been shortened, to be sure of being subjected to a harmless pulse, the key observation allows it to be the stated objective that it suffices that the energy $E_{Hc0}$ meet the inequality: $E_{Hc0} \leqq S_m$.

$$\text{Now, } E_{Hc0} = E_c \times [R_d/(R_d + H_{c0})],$$

from which $$E_c \leqq S_m \times (1 + H_{c0}/R_d)$$

or, alternatively, $$E_c \leqq S_m \times R_d/(R_d - R_c).$$

In one particular embodiment of the invention, the method will thus consist in using the first fractions of a second of the current pulse, while the discharge capacitor or capacitors are not yet completely (or all) discharged, in order to:

determine the current resistance $R_c$, taking into account the recent variation in this current resistance $R_c$, determine a risk, or the absence of risk, of the presence of a human body in contact with the fence, if a risk of presence has been determined, not corresponding to a simultaneous shortening of the fence, determine the energy $E_{max\ c0} = S_m \times R_d/(R_d - R_c)$ instantaneously where necessary, immediately limit the current pulse if there is a danger that the energy of the current pulse is about to exceed the energy $E_{max\ c0}$.

This limitation may be triggered either because, at each fraction of a second, the cumulated output energy of the pulse in progress is measured and, when it reaches X % of the energy $E_{max\ c0}$, for example 95%, the method intervenes by limiting the end of the pulse, or because, based on the prior knowledge of the characteristic curve of the output energy as a function of the equivalent resistance across the terminals of the energizer, the potential final output energy of the pulse in progress in the absence of limitation can be anticipated.

In this last case:

→ if $E_{c\ potential\ final} = E_{max\ c0}$ the method allows the maximum possible integrality of the pulse to discharge and therefore the energy $E_{c\ final}$ to reach the energy $E_{c\ potential\ final}$. In one variant of the method, it is simply considered for the following cycle that the new "latest total impedance of the system across the terminals of the energizer considered as certain not to contain any human body in danger" will now be the resistance $R_c$. In other words, the value $R_c$ replaces the value $R_d$ in the memory of the method before it is re-launched for a new cycle relating to the future pulse that will be output from the energizer in around one second. In other variants of the method, additional conditions may be required in order to update the value $R_d$, such as for example that the difference between the value $R_c$ and the value $R_d$ (or the difference between the value $R_c$ and a mean value of the latest preceding resistances) be lower than a threshold, where the threshold may be pre-determined or may be a function of various parameters such as, for example, the maximum and minimum values of the possible resistance of a human body.

→ if $E_{c\ potential\ final} > E_{max\ c0}$ the method acts on the second part of the pulse in order to reduce the total pulse in such a manner that its total energy $E_{c\ final}$ be less than or equal to the energy $E_{max\ c0}$. This reduction is carried out by one of the numerous means known to those skilled in the art such as, for example, not triggering the discharge of one of the discharge capacitors, or diverting a part of the discharge into a shunt, or the interruption of the discharge by means of an IGBT. Whatever means is chosen, the value $R_d$ is not updated in this case and keeps the value it had when the current cycle commenced.

In this particular case, where the energy $E_{c\ potential\ final}$ is higher than the energy $E_{max\ c0}$, in one variant of the invention, the method could initiate a time-out. This is designed to extend over several cycles. Its function will be to allow time for a person, not having been able for one reason or another to get off the fence after a first harmless pulse, to escape. For as long as the time-out period has not ended, the method will prohibit the energizer from delivering pulses to the fence of energy higher than the energy $E_{max\ c0}$ (or than a subsequent and lower energy $E_{max\ c'0}$, if the conditions were met for resetting the time-out before it ended to then immediately re-initiate it) and therefore potentially dangerous because it will be considered as possible that the person is still in contact with the fence. Similarly, the value $R_d$ will not be updated for as long as this time-out, or any subsequent time-out initiated before the end of a time-out in progress, will last.

A time-out could be interrupted whenever a condition chosen by the manufacturer (or possibly adjusted by the owner of the equipment) will have been met. Although the following list of the possible conditions for interruption of the time-out are not exhaustive, it includes, individually or in combination, the cases where:

- a number of cycles N of the method has passed since the initiation of the time-out without the time-out having been reset and re-initiated, N being an integer number,
- during one of the cycles, the current resistance $R_c$ goes above the preceding resistance $R_d$,
- during a new current cycle, the current resistance $R_c$ goes above $[R_{c\ original} + X\ \%\ \text{of}\ (R_d - R_{c\ original})]$, where $R_{c\_original}$ is the value taken by the current resistance $R_c$ during the first cycle having triggered the time-out,
- during an $n^{th}$ cycle of the time-out period, the current resistance $R_c$ goes above $R_{c\ n-1} + X\ \%\ \text{of}\ (R_d - R_{c\ n-1})$.

Whether a time-out has been initiated or not, the "latest total impedance of the system across the terminals of the energizer considered as being certain not to contain any human body in danger" remains fixed at the original $R_d$ value having preceded the limitation and this continues for as long as the method has not decided (owing to the fact that a new cycle has seen the condition $E_{c\ potential\ final} < E_{max\ c0}$ being finally met or owing to the fact that a time-out has ended) that a limitation is no longer necessary. Starting from this particular cycle only it takes, for the cycle in progress or for the following cycle, for example the most recent value of current resistance $R_c$ having participated in this change or, as a variant, here again by way of example, the upper value of all the values of equivalent resistance $R_{eq}$ having been successively observed in the course of the time-out.

The preceding explanations on variants of the method have been supplied implicitly assuming that the danger threshold $S_m$ was expressed in energy. It is however clear for those skilled in that art that the logic remains the same if this criterion is expressed in voltage (peak or r.m.s.) or in current. The only notable point is that the "pilotfish" technology of energizers described hereinbelow will often be that which will allow the method to be most easily applied (because the other conventional technologies lend themselves less easily to the control of the peak voltage of a pulse). Thus:

→ if the threshold $S_m$ is expressed in peak voltage, mathematical analysis shows that all the possible values of human body resistance which, coming into contact with the fence, could have the effect of making the resistance $R_{eq}$ go from the given $R_d$ value to the given $R_c$ value, it is the particular value of resistance $H_{c0}$ of the human body corresponding to the scenario of a person that has come and placed himself directly across the terminals of the energizer which will be the most critical case, in other words where the human being will find himself subjected to the highest voltage.

→ if the threshold $S_m$ is expressed in peak current, on the contrary, it is the particular case of the human body being the furthest away (in the electrical sense) from the terminals of the energizer which will have the highest proportion of the pulse current passing through it.

In the following, a particular embodiment of the method, subject of the invention, consists in using the first fractions of a second of the current pulse, while the discharge capacitor or capacitors are not yet completely (or all) discharged, in order to:

- determine the current resistance $R_c$,
- taking into account the recent variation in this current r, determine a risk, or the absence of risk, of the presence of a human body in contact with the fence,
- if a risk of presence has been determined, and
- if the calculation means determine that the voltage of the current total pulse (or the current of the current total pulse, respectively) is higher than the threshold $S_m$,
- then, the current pulse is limited.

This limitation may be triggered either because, at each fraction of a second, the peak or output voltage $V_c$ (or the peak or output current $I_c$) of the pulse in progress is measured, which allows, when the latter exceeds X % of the threshold $S_m$ for the first time, the method to intervene, or because, based on the prior knowledge of the characteristic curve of the output voltage (or output current, respectively) as a function of the equivalent resistance $R_{eq}$ across the terminals of the energizer 1$_A$, which characteristic curve(s) has/have been stored by the manufacturer in the memory of a microprocessor used by the method, the potential final output voltage (or the potential final output current, respectively) of the pulse in progress, in the absence of limitation, can be anticipated.

For example, in the case where the voltage curve is known beforehand:

→ if the voltage $V_{c\ potential\ final} = S_m$, the method allows the maximum possible integrality of the pulse to discharge and hence the voltage $V_{c\ final}$ to reach $V_{c\ potential\ final}$. In one variant of the method, the latter simply considers for the following cycle that the new "latest total impedance of the system across the terminals of the energizer considered as being certain not to contain any human body in danger" will now be the resistance $R_c$. In other words, the value $R_c$ replaces the value $R_d$ in the memory of the method before it is re-launched for a new cycle relating to the future pulse that will be output from the energizer in around one second. Other variants are possible as has been described in the case where the threshold $S_m$ is expressed in energy.

→ if the voltage $V_{c\ potential\ final} > S_{m0}$, the method acts on the second part of the pulse in order to reduce the total pulse in such a manner that the voltage $V_{c\ final}$ of its total pulse remains below the threshold $S_m$. Very clearly, in this scenario, the resistance $R_d$ is not updated and keeps the value that it had when the current cycle commenced. The reduction could be carried out for example by not triggering the discharge of one of the discharge capacitors, or by the diversion of a part of the discharge into a shunt, or (under certain very particular, or even theoretical, conditions where the current resistance $R_c$ could have been determined in time before the maximum peak voltage of the current pulse had been reached . . . ) by the interruption of the discharge by means of an IGBT.

Concerning the initiation or not of a time-out and the appropriate time from which is updated the value of the "latest total impedance of the system across the terminals of the energizer considered as being certain not to contain any human body in danger", the considerations are strictly analogous to those developed hereinabove for the case where the threshold $S_m$ is expressed in energy.

→ if the threshold $S_m$ is expressed in r.m.s. voltage or current, it suffices to observe that, once the current resistance $R_c$ has been determined, the position of any possible human body somewhere along the fence that allows the given $R_d$ value to go to the given $R_c$ value does not have any effect on the shape of the pulse leaving the energizer (since, to a first approximation, the imaginary part of the impedance across the terminals of the energizer is negligible—this approximation being especially valid for a resistance $R_d$ lower than a few thousands of Ohms). Therefore, the method is analogous to the case where the threshold $S_m$ is expressed in peak voltage or current. It will be noted that, although the fraction of a second by fraction of a second tracking, with the intervention where necessary of the method (when the cumulated fraction exceeds X % of the threshold $S_m$ for the first time), is still possible, the method based on the prior knowledge of predefined characteristic curves is no longer possible. The reason for this is that, since the r.m.s. quantities are not cumulative, they are able to vary in either an increasing or a decreasing direction as the formation of the complete pulse progresses.

→ if $S_m$ is expressed in the form of a pair of quantities [r.m.s. current $I_m$; pulse duration $\Delta t_m$], it suffices to observe that, once the current resistance $R_c$ has been determined, the position of any possible human body somewhere along the fence that allows the given $R_d$ value to go to the given $R_c$ value does not have any effect on the duration of the pulse leaving the energizer (since, to a first approximation, the imaginary part of the impedance across the terminals of the energizer is negligible—this approximation being especially valid for a resistance $R_d$ lower than a few thousands of Ohms). The method then consists in an identical manner in using the first fractions of a second of the current pulse, while the discharge capacitor or capacitors are not yet completely (or all) discharged, in order to:

- determine the current resistance $R_c$,
- taking into account the recent variation in this current r, determine a risk, or the absence of risk, of the presence of a human body in contact with the fence, the risk not corresponding to a simultaneous shortening of the fence,
- if a risk of presence has been determined, instantaneously determine the duration $\Delta t_{c\,potential\,final}$ which, in the same manner as the energy $E_c$, can have been pre-defined in memory, then, where necessary, immediately limit the current pulse:

→ $\Delta t_{c\ potential\ final} \leqq \Delta t_m$, the method allows the pulse to discharge and verifies at each moment that the output current $I_c$ never exceeds X % of $I_m$. If, during one fraction of a second, it came to exceed it for the first time, the method would intervene in order to limit the total quantity of the pulse by one of the means already discussed. If, on the other hand, the method has not at any moment been forced to intervene before the end of the complete pulse, the method, in one variant embodiment, simply considers for the following cycle that the new "latest total impedance of the system across the terminals of the energizer considered as certain not to contain any human body in danger" will now be the value $R_c$. In other words, the value $R_c$ replaces the value $R_d$ in the memory of the method before it is re-launched for a new cycle relating to the future pulse that will be output from the energizer in around one second. As has already previously been described, other variants are possible for the updating of the value $R_d$.

→ $\Delta t_{c\ potential\ final} > \Delta t_m$, independently of the intensity $I_c$, the method will, as a minimum, act on the second part of the of the pulse in order to reduce the total pulse in such a manner that the duration $\Delta t_{c\,final}$ of the total pulse remains below $\Delta t_m$. In addition, as in the case where $\Delta t_{c\ potential\ final} \leqq \Delta t_m$, the method will also follow, at each fraction of a second, the current $I_c$ and would intervene even earlier as soon as the latter came to exceed X % of $I_m$ for the first time. Very clearly, in all these scenarios, the value $R_d$ is not updated and keeps the value that it had when the current cycle commenced.

Furthermore, once again, concerning the initiation or not of a time-out and the appropriate time from which is updated the value of the "latest total impedance of the system across the terminals of the energizer considered as being certain not to contain any human body in danger", the considerations are strictly analogous to those developed hereinabove for the case where the threshold $S_m$ is expressed in energy.

The case where the threshold $S_m$ were expressed in the form of a pair of quantities [energy $E_m$; peak current $I_m$], or again the case where the threshold $S_m$ were expressed in the form of a triplet [energy $E_m$; r.m.s. current $I_m$; pulse duration $\Delta t_m$], or even an n-fold set of conditions of the same type, would be treated in a completely analogous manner.

In all the variants of the method described previously:

- each time that there is a risk of the presence of a human body with simultaneous shortening of the fence, for safety, the method limits the current output pulse to a level lower than or equal to the threshold $S_m$.
- each time that there is no risk of the presence of a human body in contact with the fence, the method does not limit the output pulse.

Various embodiments of the method will now be applied to several examples of configurations of energizers capable of being controlled by the method of the invention.

Figure 4:
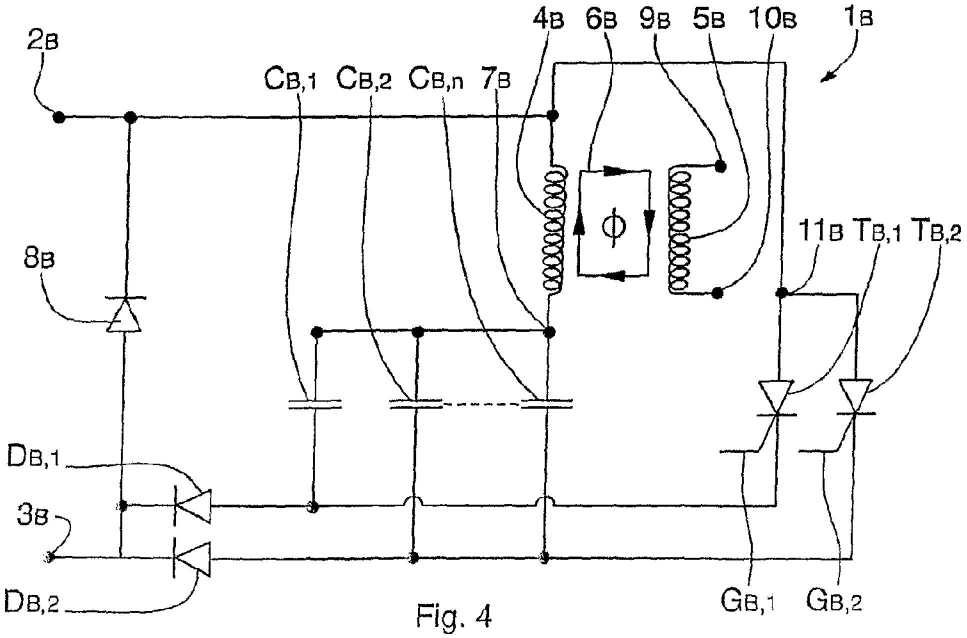
FIG. 4 is a simplified schematic view of an energizer according to a second embodiment of the invention.

With reference to FIG. 4, an electric fence energizer $\mathbf{1}_B$ can be seen comprising two input terminals $\mathbf{2}_B$ and $\mathbf{3}_B$ connected to a known power supply circuit not shown here. A diode $\mathbf{8}_B$ is connected between the terminals $\mathbf{2}_B$ and $\mathbf{3}_B$ and plays the same role as the diode $\mathbf{8}_A$ of the energizer $\mathbf{1}_A$. The energizer $\mathbf{1}_B$ comprises a transformer whose primary $\mathbf{4}_B$ is connected between the input terminal $\mathbf{2}_B$ and a common point $\mathbf{7}_B$.

An assembly of storage capacitors $C_{B,1}$ to $C_{B,n}$, n being an integer greater than or equal to 2, is connected in parallel between the common point $\mathbf{7}_B$ and the input terminal $\mathbf{3}_B$. The capacitor $C_{B,1}$ and the sub-assembly of capacitors $C_{B,2}$ to $C_{B,n}$ are respectively connected in series with a diode $D_{B,1}$ and $D_{B,2}$ in order to prevent the capacitor $C_{B,1}$ and the sub-assembly of capacitors $C_{B,2}$ to $C_{B,n}$ from discharging into one another. The common point of the cathodes of the diodes $D_{B,1}$ and $D_{B,2}$ is connected, on the one hand, to the anode of the diode $\mathbf{8}_B$ and, on the other, to the input terminal $\mathbf{3}_B$.

A thyristor $T_{B,1}$, with its trigger input $G_{B,1}$, is connected in parallel with the primary $\mathbf{4}_B$ and with the energy storage capacitor $C_{B,1}$. In a similar manner, a thyristor $T_{B,2}$, with its trigger input $G_{B,2}$, is connected in parallel with the primary $\mathbf{4}_B$ and with the sub-assembly of capacitors $C_{B,2}$ to $C_{B,n}$.

The primary $4_B$ of the transformer is connected between the common point $7_B$ of the capacitor $C_{B,1}$ and of the sub-assembly of capacitors $C_{B,2}$ to $C_{B,n}$ and the common point $11_B$ of the anodes of the thyristors $T_{B,1}$ and $T_{B,2}$, which primary is coupled, via a magnetic circuit $6_B$, to the secondary $5_B$ of the transformer. The output terminals $9_B$, $10_B$ of the secondary $5_B$ supply the conducting elements of the fence.

The capacitor $C_{B,1}$ and the sub-assembly of capacitors $C_{B,2}$ to $C_{B,n}$ are for example charged up to an individual charge voltage of $V_{C1}$ and $V_{C2}$ of several hundreds of volts by a known means, not shown. In a simpler version of the energizer, $V_{C1}=V_{C2}$=constant. In a more sophisticated version, this voltage may vary (for example, as a function of the state of the power supply, or of the time of day or night, or of the impedance region in which the equivalent system across the terminals of the electric fence is situated, etc.). Diodes $D_{B,1}$ and $D_{B,2}$ ensure that the capacitor $C_{B,1}$ and the sub-assembly of capacitors $C_{B,2}$ to $C_{B,n}$ are charged up to the same voltage and that the capacitor $C_{B,1}$, on the one side, and the sub-assembly of capacitors $C_{B,2}$ to $C_{B,n}$, on the other, can be discharged separately without modifying the state of the other remaining sub-assembly. For example, when a control pulse is applied to the trigger input $G_{B,1}$ of the thyristor $T_{B,1}$, the latter starts to conduct and the capacitor $C_{B,1}$ is discharged through the primary $4_B$ of the transformer. A first pulse then appears across the terminals of the secondary $5_B$. The sub-assembly of capacitors $C_{B,2}$ to $C_{B,n}$ stay charged owing to the presence of the diode $D_{B,2}$ that prevents it from discharging into the capacitor $C_{B,1}$.

The characteristics of the capacitor $C_{B,1}$ have, for example, been advantageously chosen such that its discharge, which could pass through a human body of resistance H, included in the range between a minimum value $H_b$ and a maximum value $H_h$, coming into contact with the fence, is never able to exceed the threshold $S_m$ even though the fence could have, prior to the contact, any given value of impedance in the range from 0 to infinity.

When during, or towards the end of, or just after, this first pulse, the method determines that there is no risk for anyone, a command is applied to the trigger input $G_{B,2}$ of the thyristor $T_{B,2}$, the sub-assembly of capacitors $C_{B,2}$ to $C_{B,n}$ is discharged through the primary $4_B$ of the transformer and a second pulse appears across the terminals of the secondary $5_B$.

The pulse across the terminals of the secondary $5_B$ is therefore, in this case, a complex pulse composed of a series of two successive individual pulses that are very closely spaced or possibly partially superimposed. The energy of the complex pulse is the sum of the energies of the individual pulses. The peak current of the complex pulse is that of the individual pulse exhibiting the highest individual peak current. The same is true for the peak voltage. The pulse duration is the time passed between the start of the first individual pulse and end of the last individual pulse. Only the r.m.s. currents and voltages cannot be directly deduced from the knowledge of their respective homologues for the individual pulses.

An individual pulse can have a duration in the range between a few hundreds of microseconds and 1 to 2 milliseconds. The physiological phenomena, that are the cause of the painful sensation felt by an animal when it is in contact with the fence wire, have response times of several tens to several hundreds of milliseconds. As a result, as long as the total duration of the complex pulse remains typically less than around 20 ms, the sensation felt by the animal is identical to that felt when it receives a single pulse whose energy is equal to the sum of the energies of the individual pulses.

The energizer $1_B$ comprises an electronic control module (not shown) designed to trigger, when the method determines it depending on the case, the thyristor or thyristors $T_{B,1}$ and $T_{B,2}$, via their trigger inputs $G_{B,1}$ and $G_{B,2}$, in order to control the discharge of the capacitor $C_{B,1}$ and of the sub-assembly of capacitors $C_{B,2}$ to $C_{B,n}$, respectively.

The electronic module comprises means for determining a risk of the presence of a human body in contact with the said electric fence, or the absence of such a risk, means for calculating the proportion of a pulse likely to pass through a human body in contact with the fence, and means for limiting a pulse.

The danger threshold $S_m$ is pre-programmed into memory by the manufacturer, as could also be the values $H_b$ and $H_h$, and/or the data corresponding to the maximum discharge characteristic curve of the energizer whether it is expressed in energy such as is shown in FIG. 3 and/or in voltage (not shown) and/or in pulse duration (not shown).

At each pulse, the electronic module determines an estimate of the equivalent electrical resistance $R_c$ across the terminals $9_B$, $10_B$ of the secondary $5_B$. The first capacitor $C_{B,1}$ therefore acts as "pilotfish" allowing the resistance $R_c$ across the terminals $9_B$, $10_B$ of the secondary $5_B$ to be determined. The module having stored in memory the resistance $R_d$ of the last pulse (or "the latest total impedance of the system across the terminals of the energizer considered as certain not to contain any human body in danger", under the assumption that a time-out would have been triggered) and now knowing the resistance of the pulse in progress $R_c$, it can compare them.

If the resistance $R_c$ is higher than the resistance $R_d$, (but also, where applicable, if a more refined comparison is desired by making use of the values $H_b$ and $H_c$, if the resistance $R_c$ is lower than the resistance $R_d$ but if $H_{c0}=R_d \times R_c/(R_d-R_c)$ is lower than the value $H_b$), the absence of risk of the presence of a human body is determined. In this case, the energizer can discharge the sub-assembly of capacitors $C_{B,2}$ to $C_{B,n}$ safely. It can clearly be seen that, in this particular case, there is no requirement to limit the power of this type of discharge, of which advantage may be taken in order to produce extremely powerful energizers, for example of 200 Joules, for the electrification of gigantic fences subjected to unbridled growth of vegetation. In the absence of contact by a human being or of sudden changes in the environment (rain, wind, etc.), the complete system will in fact have the tendency to reach an equilibrium by oscillating very slightly around a resistance value R, and hence about one out of two times (if the time-out option has not been incorporated into the method, or if its trigger parameters are sufficiently refined so as not to initiate it inadvertently), the complete system will receive the maximum pulse that can be delivered by this energizer into this resistance R which, if the energizer is very powerful (but not also out of control so as not to take the risk of starting a fire, or of "breaking down" the insulators), will allow the vegetation in contact with the electric fence to be dried out and therefore to be progressively eliminated in complete safety.

If the resistance $R_c$ is lower than the resistance $R_d$ (and, if it were desired to be especially precise, where $H_{c0}=R_d \times R_c/(R_d-R_c)$ is higher than the value $H_b$ but lower than the value $H_h$) then it is possible that the variation of the complete system from the resistance $R_d$ to the resistance $R_c$ results from the arrival of a human body of resistance H lower than or equal to the value $H_{c0}$ into contact with the fence, in other words that a risk of the presence of a human body is determined. It is then necessary to be pre-equipped for the accident risk. If the threshold $S_m$ is for example a criterion in energy, the electronic module then calculates the energy $E_{max\ c0}$, which is the highest acceptable energy of pulse for the current cycle that would allow the latter to remain harmless even if the change in the resistance $R_{eq}$ from the value $R_d$ to the value $R_c$ had truly resulted from the contact of a person with the fence in the worst-case scenario. Mathematical analysis shows that the energy $E_{max\ c0}$ is defined by the relationship: $E_{max\ c0}=S_m\times R_d/(R_d-R_c)$.

If the control module knows the output characteristic expressed in energy, it knows the energy $E_{c\ potential\ final}$ which is the maximum output energy that the energizer is able to deliver during this current cycle if the capacitors $C_{B,2}$ to $C_{B,n}$ are triggered.

If the energy $E_{max\ c0}$ is higher than the energy $E_{c\ potential\ final}$ then the electronic module commands the sub-assembly of capacitors $C_{B,2}$ to $C_{B,n}$ to discharge. The step is carried out virtually simultaneously with the preceding step where the pilotfish has been triggered so that the complex pulse is felt by the animal as only one pulse, as has been previously described.

If the energy $E_{max\ c0}$ is lower than the energy $E_{c\ potential\ final}$ then the capacitors $C_{B,2}$ to $C_{B,n}$ are not discharged during this current cycle. A time-out could be initiated which could allow a person potentially in contact with the fence, if he does not recoil from this first pulse because he is a little too entangled in the fence, to only be, in a more certain fashion, subjected to successive limited pulses for the whole time taken to extract himself. It may indeed seem exaggeratedly risky that, in such a situation, the method might in the absence of any time-out potentially let itself be driven into an error state by an unexpected change. For example, the sudden dislocation of the downstream part of the fence by the efforts of the person struggling could, without this precaution, in some cases lead the method to cause the most powerful pulse to be emitted while the person is still in contact, which could be particularly dangerous.

According to steps of methods analogous to those described in the Patent application FR 07/00875, the time-out discussed, if indeed it has been initiated, could terminate as soon as the resistance of the complete system climbs back above the value $R_d$ (or above $[R_{c\ original}+X\ \%\ \text{of}\ (R_d-R_{c\ original})]$ where $R_{c\ original}$ is the value taken by the resistance $R_{eq}$ during the first cycle having triggered the time-out) and/or, as a variant, only at the end of N pulses, N having been fixed by the manufacturer or potentially chosen and adjusted by the owner of the energizer by means of any one of the man/energizer interfaces known to those skilled in the art.

For as long as the resistance of the complete system does not climb back above the value $R_d$, and/or as long as the time-out period has not ended, the value $R_d$ is conserved in memory by the method as "the latest total impedance of the system across the terminals of the energizer considered as certain not to contain any human body in danger".

In one variant of the energizer, subject of the invention, the control module does not know the output characteristic, but the energizer is equipped with a device for the real-time analysis of the pulse across its terminals (not shown), together with an electronic switch, for example using an IGBT, able to be activated by the method. In this case, the pulse limiting is carried out by interrupting the discharge of the capacitors $C_{B,2}$ to $C_{B,n}$ whenever the current total pulse is about to reach, for example, 95% of the energy $E_{max\ c0}$.

In order to achieve maximum refinement of the precision made possible by the knowledge, where possessed, of the values $H_b$ and $H_h$, the method could also be improved when the resistance $R_c$ is hardly lower than the resistance $R_d$ such that $H_{c0}=R_d\times R_c/(R_d-R_c)$ is higher than the value $H_h$ (in other words, for example, the case of a human body dressed in insulating boots and gloves coming into contact with the terminals of the energizer). In this case, the analysis for our example hereinabove remains valid by retaining as value of the energy $E_{max\ c0}$: $E_{max\ c0}=S'_m\times R_d/(R_d-R_c)$, with $S'_m=S_m\times H_{c0}/H_h$.

Figure 5:
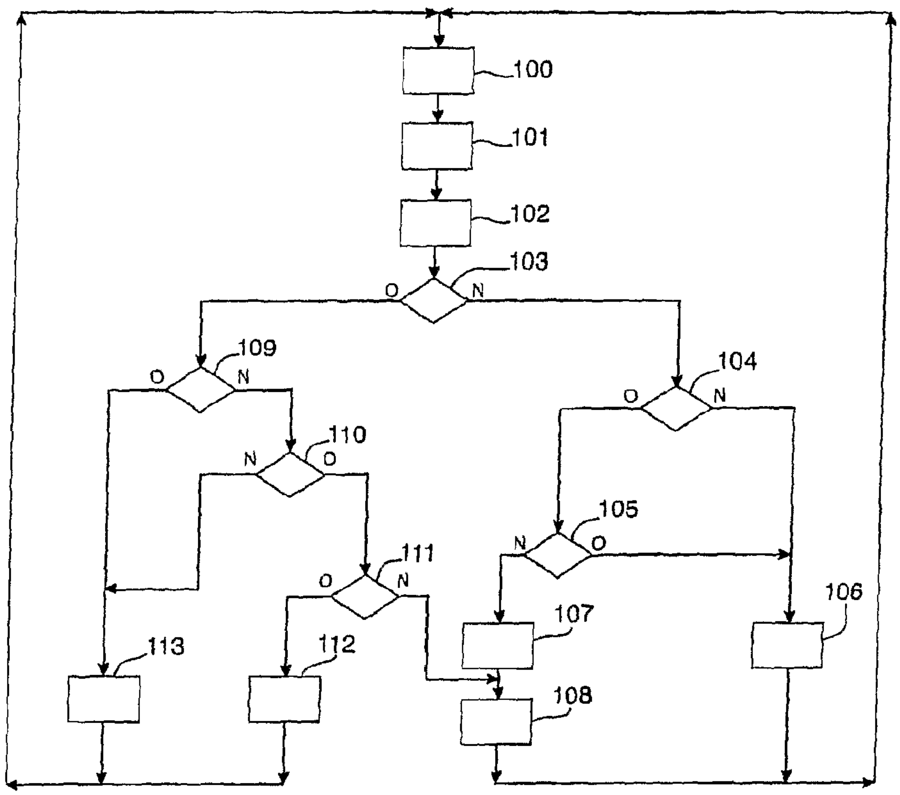
FIG. 5 is a flow diagram showing the steps of a method for controlling the energizer in FIG. 4, according to one embodiment of the invention.

Referring to FIG. 5, the steps of a simplified embodiment of a method according to the invention will now be described, which allows the energizer $\mathbf{1}_B$ to be controlled "in energy and with a time-out of predefined maximum duration, with premature termination of the time-out only if the resistance $R_c$ climbs back above the resistance $R_d$" and which is executed by the electronic control module.

A cycle corresponding to an execution of the method leading to the generation of a complex pulse $I_t$ at time t is called $K_t$. Factory programmed, the energizer in question possesses the knowledge of its output characteristic "in energy" such as is illustrated in FIG. 3. Any time the energizer is turned on, the resistance $R_d$ is reset with the highest positive numerical value that the microprocessor running the method can process.

At step 100, the method is reset. Step 100 is carried out periodically, the period being for example around a little more than one second. This step 100 covers the major part of the period and allows the capacitor $C_{B,1}$ and the sub-assembly of capacitors $C_{B,2}$ to $C_{B,n}$ to be recharged. Regarding the following steps of the method, these cover very short time frames owing to the fact that the standard applicable to fence energizers generally limits the duration of a complex pulse to a maximum of 10 ms and requires a separation of at least one second between two complex pulses.

At step 101, the electronic module commands the first capacitor $C_{B,1}$ to discharge into the primary $\mathbf{4}_B$.

At step 102, the electronic module determines an estimate of the current equivalent electric resistance $R_c$ across the terminals $\mathbf{9}_B$, $\mathbf{10}_B$ of the secondary $\mathbf{5}_B$. The first capacitor $C_{B,1}$ has therefore acted as "pilotfish".

Owing to the fact that the curve of the possible discharge energies of an energizer as a function of the resistance R is a bell curve (see FIG. 3), crossing an energy threshold on the rise is not equivalent to crossing a resistance threshold on the fall.

Furthermore, owing to the fact that the voltage of the discharge pulse at the output of the energizer exhibits 'ringing' depending on the presence and size of imaginary components in the equivalent complex impedance across the terminals $\mathbf{9}_B$, $\mathbf{10}_B$ of the secondary $\mathbf{5}_B$, it is preferable not to relate too readily a drop below a voltage threshold to a fall below a resistance threshold.

Preferably, the determination or estimation of the resistance $R_c$ is carried out as described in the document FR 2 863 816. Such a determination is low-cost and relatively reliable.

At step 103, the electronic module tests a time-out in progress condition which is verified when a time-out has been initiated during a previous application of step 107. When the condition is verified, the method goes to step 109, otherwise the method goes to step 104.

It is considered, for example, that, at the cycle $K_t$, the time-out in progress condition is not verified and the method therefore goes to step 104.

At step 104, the electronic module tests the condition "is the resistance $R_c$ lower than the resistance $R_d$?".

When the condition is verified, the method goes to step 105, otherwise the method goes to step 106.

It is, for example, considered that the condition is not verified and therefore the method goes to step 106.

At step 106, the method updates $R_d$ by giving it the value taken by $R_c$ and the electronic module commands the sub-assembly of capacitors $C_{B,2}$ to $C_{B,n}$ to discharge. Step 106 is carried out virtually simultaneously with step 101 in such a manner that the complex pulse is felt by an animal potentially present as a single pulse, as has been previously described. In this particular case, the energizer $\mathbf{1}_B$ delivers a pulse I whose energy is limited only by the marketing choice of the manufacturer as regards the characteristics of the capacitors $C_{B,1}$ to $C_{B,n}$ and of the transformer. For such a given choice, the discharge of the sub-assembly of additional capacitors $C_{B,2}$ to $C_{B,n}$ thus allows a maximum containment security to be obtained. When step 106 has been carried out, the method returns to step 100. It is now for example considered that, at cycle $K_{t+1}$, the condition in step 104 is verified, and the method therefore goes to step 105.

At step 105, the electronic module tests the condition "is the energy $E_{c\ potential\ final}$ lower than $E_{max\ c0}=S_m\times R_d/(R_d-R_c)$?".

When the condition is verified, the method goes to step 106, otherwise the method goes to step 107.

It is assumed that the condition is verified and therefore the method goes to step 106, which has already been described.

It is now considered that, for example, at cycle $K_{t+5}$, the condition in step 105 is not verified and therefore that the method goes to step 107. At this step, the electronic module initiates a time-out. The time-out has a pre-determined duration which corresponds to an integer number N greater than or, possibly, equal to 0 of cycles K. The number N corresponds to a number of cycles subsequent to the cycle in progress. They will allow a person, possibly under the influence of alcohol or of drugs or limited in his ability to pull back and receiving the pulse in progress through the head (hence likely to be experiencing partial dizziness), to extract himself from the fence before the resistance $R_d$ is updated. Optionally at this step, in order to reduce the pain and hence the risk of panic, the value of the threshold $S_m$ may be reduced to a low value for the duration of the time-out. Another possible reason that could lead to a momentary lowering of the threshold $S_m$ for the duration of the time-out being envisaged in the method could be a physiological factor such as a possible lowering of the cumulative threshold for risk of ventricular fibrillation as a result of the risk of several successive pulses passing through a human body potentially entangled in the fence in the case where the risk of having a scenario with less than one heart beat between each pulse also existed.

A value of N equivalent to at least one minute is preferably envisaged but smaller or greater values of N may be chosen.

At step 108, the electronic module prevents all or part of the sub-assembly of capacitors $C_{B,2}$ to $C_{B,n}$ from discharging into the primary $\mathbf{4}_B$, for example by commanding the discharge of the sub-assembly of capacitors $C_{B,2}$ to $C_{B,n}$ not to be triggered. As a variant, the discharge, or a part of the discharge, of the sub-assembly of capacitors $C_{B,2}$ to $C_{B,n}$ is diverted into a shunt (not shown), or is interrupted. Such a diversion or interruption can be effected for example by an electronic sub-circuit using a thyristor or IGBT (not shown in FIG. 4). This step allows the energy of the pulse in progress $I_{t+5}$ to be decreased below $E_{max\ c0}=S_m\times R_d/(R_d-R_c)$ and therefore the safety of any person that may potentially have come into contact with the fence between $I_{t+4}$ and $I_{t+5}$ to be preserved. When step 107 has been carried out, the method returns to step 100.

It will be noted that the adaptation of the energy of the pulse I, here the pulse $I_{t+5}$, is carried out instantaneously in real time, in other words the electronic module prevents for example the sub-assembly of capacitors $C_{B,2}$ to $C_{B,n}$ from discharging in the current cycle itself, here cycle $K_{t+5}$, in which the condition in step 105 has not, for the first time, been met.

During this event, it is in fact considered that the accident risk appears and that, as long as it is not certain that this only results from an increase in the parallel losses, it is temporarily more important to concentrate on the safety of people rather than the containment security. However, the latter can only be reduced to the strict minimum if the limitation of $C_{B,2}$ to $C_{B,n}$ is only carried out "as accurately as possible" via the diversion through a shunt or the interruption of the discharge, for example by means of a circuit using an IGBT, in such a manner that the energy $E_{c\ final}$ is very close or preferably equal to the energy $E_{max\ c0}$. In this scenario, it is then certain that, in any situation, including during a time-out, that people's safety and the containment security have been simultaneously maximized. This represents a significant advantage, for example with respect to the method described in the application FR 07/00875.

At cycle $K_{t+6}$, the condition in step 103 is verified since a time-out has been initiated at cycle $K_{t+5}$ when going to step 107 (it is assumed here that N>0). The method therefore goes to step 109.

At step 109, the electronic module tests a time-out almost ended condition which is only verified when the duration programmed for the time-out, corresponding to a number N of cycles, is about to run out. When the condition is verified, the method goes to step 113, otherwise the method goes to step 110.

It is for example considered that N=60. In the example, the time-out has been initiated at cycle $K_{t+5}$, hence at cycle $K_{t+6}$ the condition in step 109 is not verified and the method goes to step 110.

At step 110, the electronic module tests the condition "is the resistance $R_c$ lower than the resistance $R_d$?".

When the condition is verified, the method goes to step 111, otherwise the method goes to step 113.

It is considered, for example, that at cycle $K_{t+6}$, the condition in step 110 is verified and hence step 111 is carried out next.

At step 111, the electronic module tests the condition "is the energy $E_{c\ potential\ final}$ lower than $E_{max\ c0}=S_m\times R_d/(R_d-R_c)$?". When the condition is verified, the method goes to step 112, otherwise the method goes to step 108.

It is assumed that, at cycle $K_{t+6}$, the condition in step 111 is not verified and the method goes to step 108 already described above.

It is assumed that, at cycle $K_{t+7}$, the situation has slightly changed and that, after having effected step 110 then arrived at step 111, the method observes that the condition in step 111 is now verified. The method goes to step 112.

At step 112, the method does not terminate the time-out but commands the electronic module to discharge the sub-assembly of capacitors $C_{B,2}$ to $C_{B,n}$, then the method goes to step 100.

It is then assumed that at the following cycle, $K_{t+8}$, the situation has completely changed and that, at step 110, the method observes that this time the condition in step 110 is no longer verified. Step 113 is therefore carried out next.

At step 113, the method stops the time-out, updates the resistance $R_d$ by assigning it the value of the resistance $R_c$ and the electronic module commands the sub-assembly of capacitors $C_{B,2}$ to $C_{B,n}$ to discharge, then the method goes to step 100. Thus, at the first cycle K clearly marking the end of a potential risk of a person coming into contact with the fence, the containment security immediately returns to its maximum.

In order to illustrate the last possible scenario for this version of the method, it is now considered that, for example, a time-out has been initiated at step 107 of the cycle $K_{t+10}$ and that, at cycles $K_{t+11}$ to $K_{t+69}$, the method went through steps 109 then 110 and 111 and finally 108 before returning to step 100. Then, at step 109 of cycle $K_{t+70}$, the method goes to step 113 that has already been described.

Indeed, if during the whole duration of the time-out the condition in step 110 remained non-verified, the most likely is that the initial condition having triggered the limitation did not result from a human body having come into contact with the electric fence, but rather from another kind of abrupt parallel loss incapable of removing itself (a tree fallen onto the fence . . . ? sudden downpour . . . ? etc. . . . ). The longer the time-out, the more reasonable it is to assume that a human being would already have extracted himself at its termination. In view of this very strong possibility, when the time-out last for its maximum time, once it is finished the containment security can again be assigned the total priority under the control of a resistance $R_d$ re-adjusted to a lower value.

Figure 6:
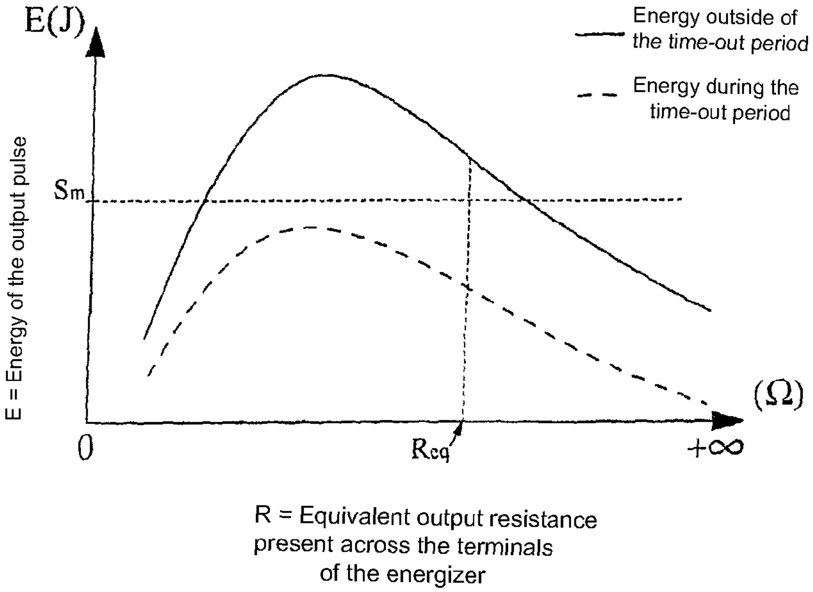
FIG. 6 is a graph showing a curve of the energy of the pulse emitted by the energizer in FIG. 4 as a function of the equivalent resistance between its output terminals.

With reference to FIG. 6, it can be seen that the energy E delivered at each pulse by an energizer $\mathbf{1}_B$ (for which the limitation could be effected by non-triggering of the capacitors $C_{B,1}$ to $C_{B,n}$) varies, on the one hand, as a function of the equivalent resistance $R_{eq}$ and, on the other, as a function of what the conditions necessary for the time-out currently are, in other words on whether there might be a risk of the presence of a person in contact with the fence. During the time-out, the energy E is momentarily limited to that of an energizer of much lower power than that which could be delivered if all the capacitors $C_{B,1}$ to $C_{B,n}$ discharged, and, outside of the time-out, the energy E has nominal value.

For a a given value of the resistance $R_{eq}$, the energizer $\mathbf{1}_B$ can therefore deliver two output pulses that are very markedly different depending on whether the time-out is effective or not.

An example of judicious choice of the characteristics of the pilotfish and of the transformer can also be seen here, which allow the device to be certain that, during the whole time-out period, whatever the equivalent resistance $R_{eq}$, the threshold $S_m$ is not exceeded.

Figure 7:
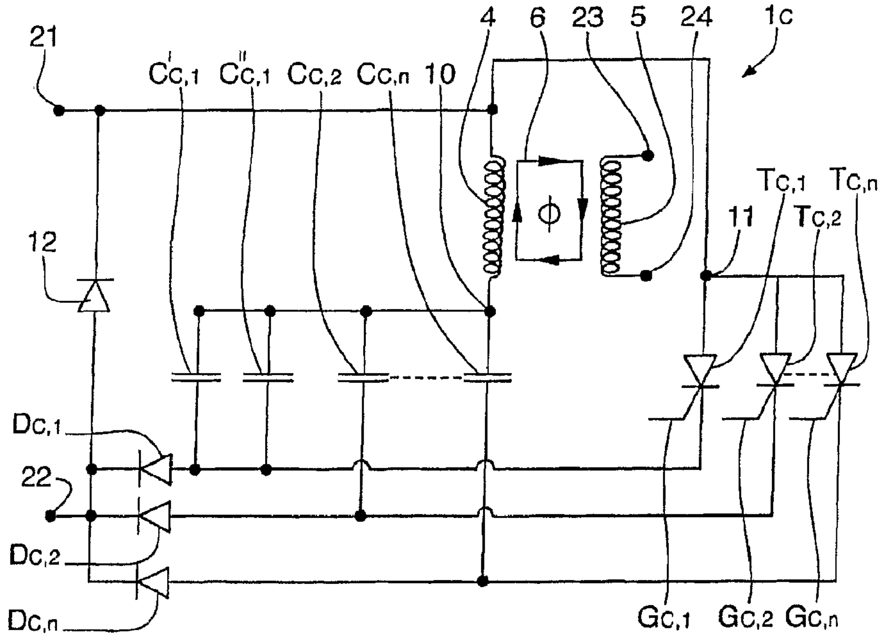
FIG. 7 is a simplified schematic view of an electric fence energizer according to a third embodiment of the invention.

FIG. 7 illustrates a second embodiment of the invention. The elements of the energizer $\mathbf{1}_c$ that are identical to the first embodiment are denoted by the same reference number and are not described again. Here, the capacitor $C_{B,1}$ is replaced by the combination of two capacitors $C'_{C,1}$ and $C''_{C,1}$ designed to be triggered simultaneously by the same thyristor $T_{C,1}$ or, as a variant (not shown), by two independent thyristors.

In the second embodiment, the capacitors of the sub-assembly of capacitors $C_{C,2}$ to $C_{C,n}$ are controlled by several thyristors $T_{C,2}$ to $T_{C,n}$. The use of several thyristors $T_{C,2}$ to $T_{C,n}$ allows the number of capacitors $C_{C,2}$ to $C_{C,n}$ triggered or held during the time-out to be varied more precisely.

Other variants are possible. For example, using IGBTs, the interruption Of the discharge, or of a part of the discharge, of the capacitor $C_1$ and/or of a part of the sub-assembly of capacitors $C_2$ to $C_n$ can be controlled. As an alternative, these discharges may be partially or totally diverted into a shunt.

The charge level of the capacitor $C_1$ and/or of a part of the sub-assembly of capacitors $C_2$ to $C_n$ may also be controlled, in addition to the control of the discharge, for certain or for all the possible values of the resistance $R_{eq}$ and/or during, or with the exclusion of, the time-out period, or else for any other possible reason such as, for example, a random function at each cycle, or else the state of the power supply of the energizer, for example non-exhaustive.

It will be clearly understood that the existence of only one pilotfish is not a necessary condition for the method. Thus, for example, the very conventional architecture of the energizer $\mathbf{1}_A$, shown in FIG. 2, can be used with no problem for the application of the method if, for example, the first few % of the discharge of the capacitors $C_{A,1}$ to $C_{A,n}$ at each cycle were dedicated to the determination of the resistance $R_C$, and if the remaining time of the discharge were to be dedicated to the limitation either by diverting into a shunt or by interruption of the discharge by means of an IGBT. Similarly, it is clear that the existence of more than one discharge capacitor is not a necessary condition.

Finally, the energizer can have an architecture with more than one transformer so as to better cover, for a given bank of capacitors, certain ranges of equivalent resistances.

Figure 8:
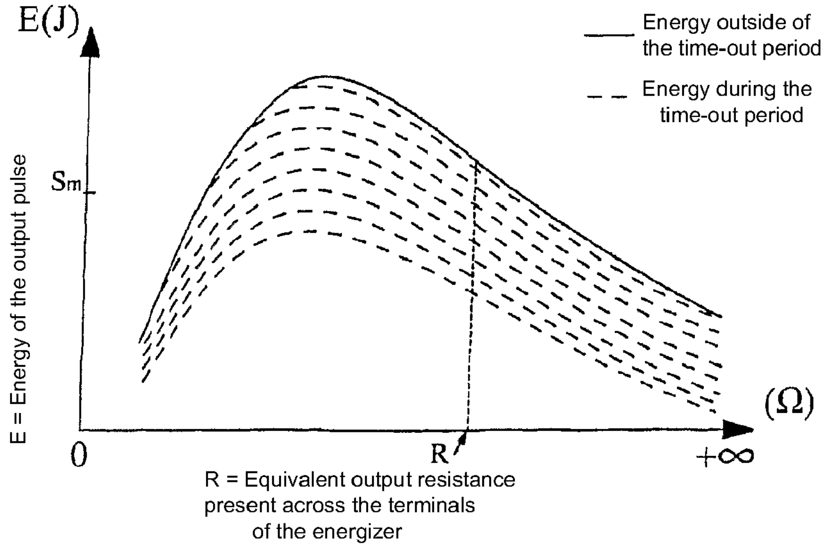
FIG. 8 is a graph showing a set of curves of the energy of the pulse emitted by the energizer in FIG. 7 as a function of the equivalent resistance between its terminals, the energizer being controlled by the method in FIG. 5.

Based on these variations of possible structures of the energizer well known to those skilled in the art, a control method according to the invention can adjust the output characteristics of the energizer $\mathbf{1}_C$ much more finely during the time-out period in such a manner that its various output curves may, for example, be those illustrated in FIG. 8 in particular, if it is based on the solutions for interruption of the discharge by diversion using an IGBT or by diverting into a shunt, it can exactly deliver for the whole time-out period the highest pulse still reasonable with regard to its proportion that will finally flow, in the worst case scenario, through a human body that might have come into contact with the fence.

Although the invention has been described in relation to several particular embodiments, it is very clear that it is in no way limited to these, and that it comprises all the technical equivalents of the means described together with their combinations if these remain within the scope of the invention.

The invention claimed is:

1. Method for controlling an electric fence energizer with periodic pulses, in which a proportion of a pulse capable of passing through a human body in contact with the said electric fence is higher than a danger threshold ($S_m$) not to be exceeded in the human body, the said danger threshold being relative to an electrical quantity of the pulse, the said energizer comprising or being associated with:

means for determining a risk of the presence of a human body in contact with the said electric fence, or the absence of such a risk, means for calculating the proportion of a pulse capable of passing through a human body in contact with the fence, and means for limiting a pulse, wherein, during a pulse, when the said determination means have determined a risk of the presence of a human body in contact with the fence, and when the said calculation means have defined that the proportion of the said pulse capable of passing through the human body is higher than the said danger threshold ($S_m$), the said limiting means limit the said pulse such that the proportion of the said pulse received by the said human body is lower than the said danger threshold ($S_m$), the method further comprising a step of carrying out a measurement of the equivalent resistance across the terminals of the said energizer; and a step of determining the maximum proportion of the said pulse capable of passing through the said human body as a function of the said current equivalent resistance and of a preceding equivalent resistance measured during a preceding pulse.

2. Method according to claim 1, further comprising a step of sending a command for a pulse to be delivered an electrical quantity of which is such that the proportion of this pulse capable of passing through a human body is higher than the said danger threshold ($S_m$), the said step being carried out during certain pulses where the absence of risk of a human body in contact with the electric fence has been determined.

3. Method according to claim 1, further comprising a step of sending a command for a pulse to be delivered an electrical quantity of which is such that the proportion of this pulse capable of passing through a human body is higher than the said danger threshold ($S_m$), the said step being carried out during each pulse where the absence of risk of a human body in contact with the electric fence has been determined and where the energizer is capable of delivering such a pulse.

4. Method according to claim 1, characterized in that the said means for determining a risk of the presence of a human body in contact with the said electric fence comprise at least one element of the group constituted by: a video analysis system with shape recognition, a system for analysing the mechanical tension existing within conductors of the electric fence, a system for analysing the vibrational state existing within conductors of the electric fence, a system for analysing the audio signal existing in proximity to the electric fence, a system for analysing the resistive part of the equivalent impedance observable at a point in the electric fence during in each pulse, a visual surveillance system, a mechanical surveillance system, an audio surveillance system, an electrical surveillance system internal to the energizer, an electrical surveillance system external to the energizer, an electrical surveillance system at the start of the electric fence, an electrical surveillance system displaced to one point of the electric fence, an electrical surveillance system distributed over several points of the electric fence.

5. Method according to claim 1, characterized in that the determination of a risk of the presence of a human body in contact with the said electric fence is performed just before the pulse is launched or during the first part of the production of the said pulse, before the said pulse has reached a level presenting a risk for a human body that could potentially be in contact with the electric fence.

6. Method according to claim 5, characterized in that when the absence of risk of the presence of a human body has been determined, the pulse delivered is higher than or equal to the said danger threshold ($S_m$).

7. Method according to claim 1, characterized in that, when a risk of the presence of a human body has been determined, the method further comprising a step of initiating a time-out during which each pulse is limited, the duration of the time-out being, where desirable, adjustable by a manufacturer and/or by a user.

8. Method according to claim 7, further comprising carrying out a measurement of the equivalent resistance across the terminals of the energizer, said time-out being interrupted when the current equivalent resistance climbs back above a pre-determined threshold.

9. Method according to claim 8, characterized in that the said pre-determined threshold corresponds to the equivalent resistance measured during the pulse preceding the pulse during which the said time-out has been triggered.

10. Method according to claim 8, characterized in that the said pre-determined threshold corresponds to the sum of the trigger equivalent resistance measured during the trigger pulse during which the time-out has been triggered and of a pre-determined percentage of the difference between the previous equivalent resistance measured during the pulse preceding the trigger pulse and the trigger equivalent resistance.

11. Method according to claim 7, further comprising carrying out a measurement of the equivalent resistance across the terminals of the energizer, said time-out being interrupted when the current equivalent resistance climbs back above the previous equivalent resistance measured during the pulse preceding the trigger pulse during which the time-out has been triggered, the current equivalent resistance not exceeding a pre-determined percentage higher than 100% of the said preceding equivalent resistance.

12. Method according to claim 7, further comprising carrying out a measurement of the equivalent resistance across the terminals of the energizer, said time-out being interrupted when the current equivalent resistance climbs back above the sum of the trigger equivalent resistance measured during the trigger pulse during which the time-out has been triggered and of a first percentage pre-determined from the difference between the previous equivalent resistance measured during the pulse preceding the trigger pulse and the trigger equivalent resistance, the said current equivalent resistance not exceeding a second pre-determined percentage higher than 100% of the said preceding equivalent resistance.

13. Method according to claim 1, characterized in that a risk of the presence of a human body is determined when the current equivalent resistance measured during the current pulse is lower than a preceding equivalent resistance measured during a preceding pulse.

14. Method according to claim 1, characterized in that the absence of risk of the presence of a human body is determined when the current equivalent resistance is higher than or equal to a preceding equivalent resistance measured during a preceding pulse.

15. Method according to claim 1, characterized in that the absence of risk of the presence of a human body is determined when the current equivalent resistance is higher than or equal to a preceding equivalent resistance measured during a preceding pulse, the said current equivalent resistance being lower than a pre-determined percentage greater than 100% of the said preceding equivalent resistance.

16. Method according to claim 15, characterized in that a risk of the presence of a human body is determined when the current equivalent resistance is higher than or equal to the said pre-determined percentage greater than 100% of the said preceding equivalent resistance.

17. Method according to claim 1, the said danger threshold being relative to the pulse energy, characterized in that, when a risk of the presence of a human body has been determined, the maximum pulse emitted by the energizer is lower than or equal to the product of the said danger threshold and of the ratio between, on the one hand, a preceding equivalent resistance measured during a preceding pulse and, on the other, the difference between the said preceding equivalent resistance and the current equivalent resistance.

18. Method according to claim 1, the said danger threshold being relative to the pulse energy, characterized in that the absence of risk of the presence of a human body in contact with the fence where the human body could receive a proportion of the pulse higher than the said danger threshold $S_m$ is determined when, during the preceding pulse, the absence of risk of the presence of a human body in contact with the fence has been determined, and the maximum pulse that could be emitted by the energizer for the current equivalent resistance is lower than or equal to the product of the said danger threshold and of the ratio between, on the one hand, the preceding equivalent resistance measured during the preceding pulse and, on the other, the difference between the said preceding equivalent resistance and the current equivalent resistance.

19. Method according to claim 1, the said danger threshold being a function of the pulse voltage or of the pulse current, characterized in that, when a risk of the presence of a human body has been determined, the maximum output pulse emitted by the energizer is lower than or equal to the said danger threshold.

20. Electric fence energizer capable of executing the method according to claim 19 in the case where the quantity being considered for the danger threshold ($S_m$) is an r.m.s, value, an electronic circuit measures the r.m.s. voltage or the r.m.s, current of the discharge pulse in real time and limits the latter when it reaches, for the first time, X % of the danger threshold ($S_m$).

21. Method according to claim 1, characterized in that the limiting of the pulse is carried out at a moment determined as a function of the maximum pulse capable of being delivered by the said energizer for the said current equivalent resistance.

22. Method according to claim 1, characterized in that it is only executed when the said equivalent resistance measured across the terminals of the energizer is lower than a pre-determined threshold ($R_s$) or included within a pre-determined range ([$R_{s1}$; $R_{s2}$]).

23. Method according to claim 1, characterized in that a risk of the presence of a human body in contact with the electric fence is determined as a function of a pre-determined minimum impedance ($H_b$) of a human body and/or of a pre-determined maximum impedance ($H_h$) of a human body, the said minimum and maximum impedances being, where required, adjustable by a manufacturer and/or a user.

24. Method according to claim 23, further comprising carrying out a measurement of the equivalent resistance across the terminals of the energizer, the previous equivalent resistance ($R_d$) being associated with the last pulse for which the absence of risk of the presence of a human body has been determined, characterized in that the absence of risk of the presence of a human body is determined when the current equivalent resistance ($R_c$) is higher than or equal to the previous equivalent resistance ($R_d$) or when $[R_d \cdot R_c/(R_d - R_c)] < H_b$.

25. Method according to claim 24, the said danger threshold ($S_m$) being relative to the pulse energy, characterized in that a risk of the presence of a human body is determined when the current equivalent resistance ($R_c$) is lower than the previous equivalent resistance ($R_d$), and, in this case, if the current equivalent resistance ($R_c$) is higher than $H_h \cdot R_d/(R_d + H_h)$, then the maximum pulse emitted by the energizer is lower than or equal to $S_m \cdot R_c \cdot R_d^2/[H_b \cdot (R_d - R_c)^2]$ otherwise, the maximum pulse emitted by the energizer is lower than or equal to $S_m \cdot R_d/(R_d - R_c)$.

26. Method according to claim 1, characterized in that, when a risk of the presence of a human body is determined, the method limits the current pulse to a level depending on a pre-determined minimum impedance ($H_b$) of a human body and/or of a pre-determined maximum impedance ($H_h$) of a human body.

27. Method according to claim 1, characterized in that the said danger threshold ($S_m$) varies as a function of the configuration of the fence and/or of weather and/or time conditions and/or of geographical location and/or of altitude and/or of installation of the electric fence within its environment or again as a function of the duration of the maximum time-out programmed by the user or of the date.

28. Method according to claim 27, characterized in that the said danger threshold ($S_m$) varies as a function of the number of consecutive pulses for which a risk of the presence of a human body has been determined.

29. Method according to claim 1, characterized in that the said danger threshold ($S_m$) is defined in the group constituted by: an energy in joules, a peak value of current in amps, an r.m.s, current in amps, a peak value of voltage in volts, an r.m.s. voltage value in volts, a maximum quantity of electricity per pulse in coulombs, a maximum pulse duration, a period during which the instantaneous value of the pulse exceeds a certain current level, a specific fibrillation energy, a specific charge, an instantaneous power, a combination of danger thresholds formed using several of these dimensions.

30. Control method according to claim 1, the said energizer being capable of delivering pulses of more than 200 Joules into 500 Ohms, characterized in that the said danger threshold is lower than or equal to 5 Joules for a human body whose impedance is in the range between 50 and 1050 Ohms, the energizer being capable of delivering pulses of more than 200 Joules when the said electric fence has been stabilized for 60 minutes at an equivalent resistance of 500 Ohms+/−5%.

31. Control method according to claim 1, characterized in that the said danger threshold is adjustable by a manufacturer and/or by a user.

32. Electric fence energizer characterized in that it comprises or is combined with:

means for determining a risk of the presence of a human body in contact with the said electric fence, or the absence of such a risk, means for calculating the proportion of a pulse capable of passing through a human body in contact with the fence, and means for limiting a pulse, said electric fence energizer being capable of executing the method according to claim 1.

33. Electric fence energizer according to claim 32, the danger threshold ($S_m$) including a component characterizing a pulse duration, characterized in that an electronic circuit measures the discharge pulse duration in real time and limits the latter when it reaches, for the first time, X % of the said component characterizing a pulse duration with X strictly less than 100.

* * * * *